United States Patent
Zhang et al.

(10) Patent No.: US 11,855,819 B2
(45) Date of Patent: Dec. 26, 2023

(54) WAVEFORM MULTIPLEXING IN MILLIMETER WAVE BAND

(71) Applicant: QUALCOMM INCORPORATED, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/541,077

(22) Filed: Dec. 2, 2021

(65) Prior Publication Data

US 2022/0094584 A1 Mar. 24, 2022

Related U.S. Application Data

(62) Division of application No. 16/513,350, filed on Jul. 16, 2019, now Pat. No. 11,223,505.

(60) Provisional application No. 62/721,400, filed on Aug. 22, 2018.

(51) Int. Cl.
*H04L 27/26* (2006.01)
*H04W 16/28* (2009.01)
*H04W 72/0453* (2023.01)
*H04L 5/00* (2006.01)

(52) U.S. Cl.
CPC ........ *H04L 27/2607* (2013.01); *H04L 5/0094* (2013.01); *H04W 16/28* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2015/0264552 A1 | 9/2015 | Xiong et al. | |
| 2016/0006586 A1 | 1/2016 | Berardinelli et al. | |
| 2018/0167184 A1* | 6/2018 | Zhou | H04L 5/0048 |

(Continued)

FOREIGN PATENT DOCUMENTS

| | | | |
|---|---|---|---|
| WO | 2017096131 A1 | 6/2017 | |
| WO | WO-2017096131 A1 * | 6/2017 | H04L 27/2607 |

OTHER PUBLICATIONS

International Preliminary Report on Patentability—PCT/US2019/042198 The International Bureau of WIPO—Geneva, Switzerland, dated Mar. 4, 2021.

(Continued)

*Primary Examiner* — Kouroush Mohebbi
(74) *Attorney, Agent, or Firm* — Haynes and Boone, LLP/Qualcomm Incorporated

(57) ABSTRACT

Wireless communications systems and methods related to multiplexing different waveforms in wireless networks are provided. A first wireless communication device identifies a configuration for communicating a first guard interval (GI)-based waveform signal after at least one of a second GI-based waveform signal or a cyclic prefix (CP)-based waveform signal. The first wireless communication device communicates, with a second wireless communication device, the first GI-based waveform signal including a plurality of first symbols, wherein a beginning symbol of the plurality of first symbols include repetitions of a reference signal sequence based on the configuration.

12 Claims, 14 Drawing Sheets

(56) References Cited

U.S. PATENT DOCUMENTS

2019/0141555 A1    5/2019  Tooher et al.
2019/0306923 A1*  10/2019  Xiong ................. H04J 13/0062
2020/0067748 A1    2/2020  Zhang et al.
2021/0105658 A1*   4/2021  Olsson .............. H04W 72/0446

OTHER PUBLICATIONS

International Search Report and Written Opinion—PCT/US2019/042198—ISA/EPO—dated Dec. 16, 2019.
Partial International Search Report—PCT/US2019/042198—ISA/EPO—dated Oct. 24, 2019.

* cited by examiner

WAVEFORM MULTIPLEXING IN MILLIMETER WAVE BAND

CROSS REFERENCE TO RELATED APPLICATIONS

The present application is a divisional application of U.S. patent application Ser. No. 16/513,350, filed Jul. 16, 2019, which claims priority to and the benefit of U.S. Provisional Patent Application No. 62/721,400, filed Aug. 22, 2018, each of which is hereby incorporated by reference in its entirety as if fully set forth below and for all applicable purposes.

TECHNICAL FIELD

This application relates to wireless communication systems, and more particularly to multiplexing different waveforms in wireless networks operating at high millimeter wave (mmWave) bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

While mmWave bands can provide a greater data throughput, the high center frequency can cause challenges to communications. For example, radio frequency (RF) phase noise and propagation loss increase with frequency across the mmWave bands. In order to reach a certain range or coverage, a higher transmission power may be required when operating in the high mmWave bands. However, power amplifiers may typically have a low power efficiency at high frequencies.

One approach to increasing the link budget is to employ waveforms with a lower peak-to-average power ratio (PAPR). For example, single-carrier (SC) waveforms may have a lower PAPR than orthogonal frequency division multiplexing (OFDM) waveforms. There are several types of SC waveforms, for example, a cyclic prefix (CP)-based SC waveform and a guard interval (GI)-based SC waveform. A wireless communication network may employ different types of SC waveforms and/or OFDM waveforms for communications depending on the performance requirements.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including identifying, by a first wireless communication device, a configuration for communicating a first waveform signal before a guard interval (GI)-based waveform signal, the configuration indicating a GI waveform requirement of the GI-based waveform signal; and communicating, by the first wireless communication device with a second wireless communication device, the first waveform signal including a plurality of first symbols carrying data, wherein a last symbol of the plurality of first symbols includes a portion without data transmission based on the GI waveform requirement.

In an additional aspect of the disclosure, a method of wireless communication, including identifying, by a first wireless communication device, a configuration for communicating a first guard interval (GI)-based waveform signal after at least one of a second GI-based waveform signal or a cyclic prefix (CP)-based waveform signal; and communicating, by the first wireless communication device with a second wireless communication device, the first GI-based waveform signal including a plurality of first symbols, wherein a beginning symbol of the plurality of first symbols include repetitions of a reference signal sequence based on the configuration.

In an additional aspect of the disclosure, a method of wireless communication device, including communicating, by a first wireless communication device with a second wireless communication device in a first frequency band, a guard interval (GI)-based waveform signal; and communicating, by the first wireless communication device with the second wireless communication device in a second frequency band, a cyclic prefix (CP)-based waveform signal, the second frequency band spaced apart from the first frequency band by a guard frequency band.

In an additional aspect of the disclosure, an apparatus including a processor configured to identify a configuration for communicating a first waveform signal before a guard interval (GI)-based waveform signal, the configuration indicating a GI waveform requirement of the GI-based waveform signal; and a transceiver configured to communicate, with a first wireless communication device, the first waveform signal including a plurality of first symbols carrying data, wherein a last symbol of the plurality of first symbols includes a portion without data transmission based on the GI waveform requirement.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
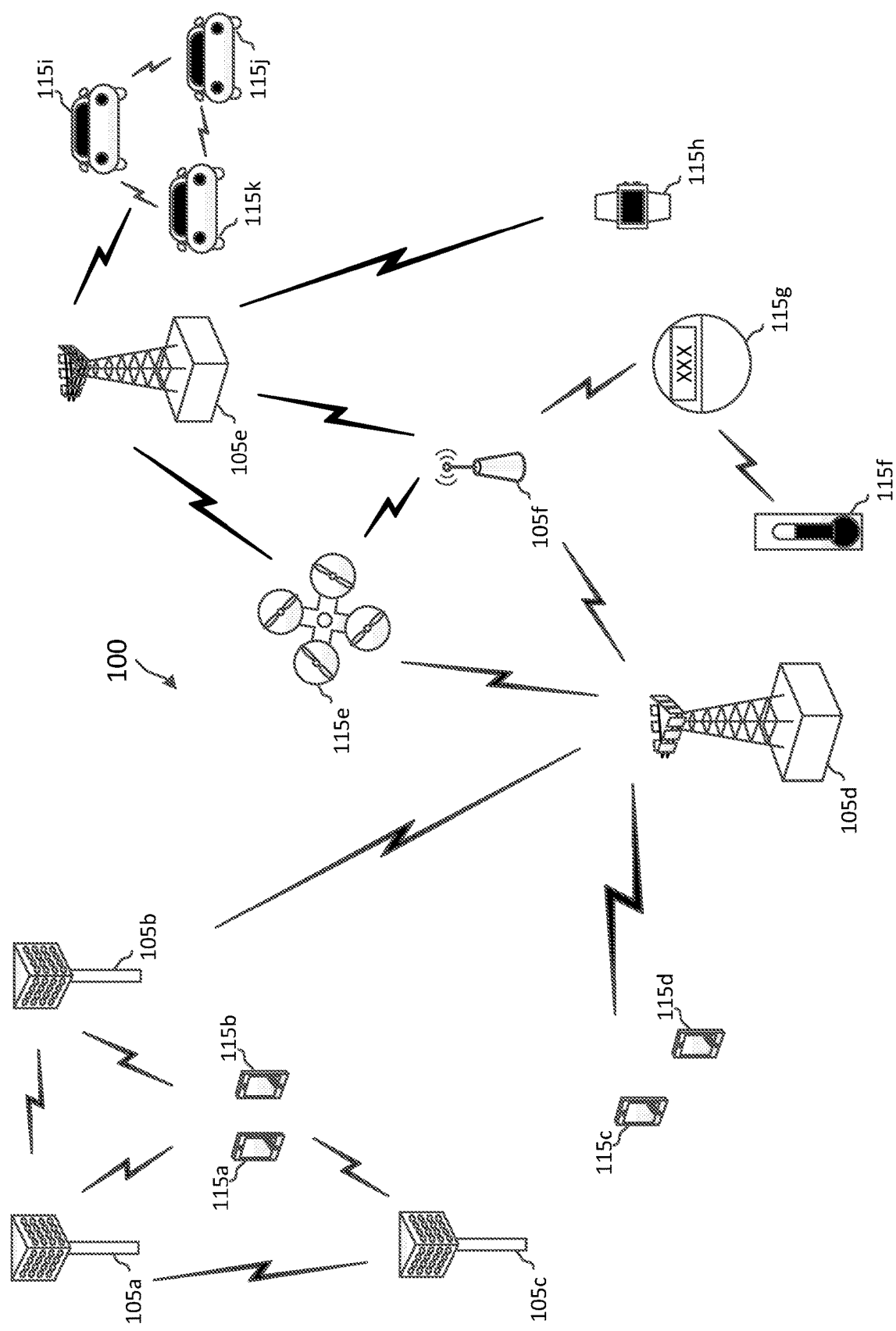
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As described above, a wireless network operating at a high mmWave band, for example, above 50 gigahertz (GHz), may use single-carrier (SC) waveforms for a reduced peak-to-average power ratio (PAPR). In some examples, a network may use different types of waveforms for communications depending on performance requirements. For example, a network may use a combination of CP-based OFDM waveforms, CP-based SC waveforms, and/or GI-based SC waveforms. Different waveforms may have different signal properties or structures. Some waveform signals may have certain signal dependencies on a previous waveform signal and/or a subsequent waveform signal transmitted in the same frequency spectrum. For example, a CP-based waveform signal may include symbols, each including a CP preceding a useful portion, where the CP is a copy of the last portion of the useful portion. A GI-based waveform signal may include symbols, each including a useful portion followed by a GI. The CP and the GI may provide waveform repetitions, which may serve to mitigate inter-symbol interference (ISI). However, each CP-based symbol is self-contained in terms of providing ISI mitigation, whereas each GI-based symbol depends on the GI of a previous GI-based symbol for ISI mitigation.

The present application describes mechanisms for multiplexing different waveform signals in a network. For example, the network may operate at a high mmWave band above 52.6 gigahertz (GHz). The network may use CP-based OFDM or SC waveforms and/or GI-based SC waveforms. In an embodiment, when a CP-based waveform signal is transmitted before a GI-based waveform signal, the CP-based waveform signal may include a blank period in the last symbol to provide ISI mitigation to the following GI-based waveform signal. The CP-based waveform signal may include a GI at the end of the last symbol, which may serve as a GI to the first symbol of the GI-based waveform signal. In an embodiment, when a GI-based waveform signal is transmitted after a CP-based waveform signal, the GI-based waveform signal may include multiple identical reference signal sequences (e.g., demodulation reference signal (DMRSs)) in a beginning symbol of the GI-based waveform signal. The multiple identical reference signal sequences provide waveform repetitions at the beginning of the GI-based waveform signal, and thus may remove the signal dependencies of a previous signal from the GI-based waveform signal. The disclosed embodiments may also be applied to multiplexing GI-based waveform signals with different GI waveforms. The disclosed embodiments may be applied to communications in a licensed spectrum, a shared spectrum, and/or an unlicensed spectrum.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel during the TXOP. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected from the channel.

In an embodiment, the network 100 may operate in a high mmWave band with a wide channel bandwidth. The high mmWave band may be at frequencies higher than about 52.6 gigahertz (GHz), for example, at about 60 GHz, and the channel may have a bandwidth of about 2.16 GHz. The high mmWave band may include a licensed band, an unlicensed band, and/or a shared frequency band. As described above, RF noise and propagation loss may be high at the high mmWave bands, while the power amplifiers may have low power efficiency at high frequencies (e.g., in particular at the UEs 115). The BSs 105 may communicate with the UEs 115 using single-carrier (SC) waveforms, which may have a lower PAPR than multicarrier OFDM waveforms and thus may improve the link budget. In addition to the lower PAPR, SC waveforms can allow for time-domain processing, which may be less complex than frequency-domain processing required for processing multicarrier OFDM waveforms. Some examples of waveforms may include CP-based OFDM waveform, CP-based SC waveforms, and GI-based SC waveforms. CP-based waveforms and GI-based waveforms have different signal properties. Thus, the network 100 may consider the different signal properties when multiplexing CP-based waveform signals with GI-based waveform signals and/or multiplexing GI-based waveform signals with different GI waveforms, as described in greater detail herein.

Figure 2:
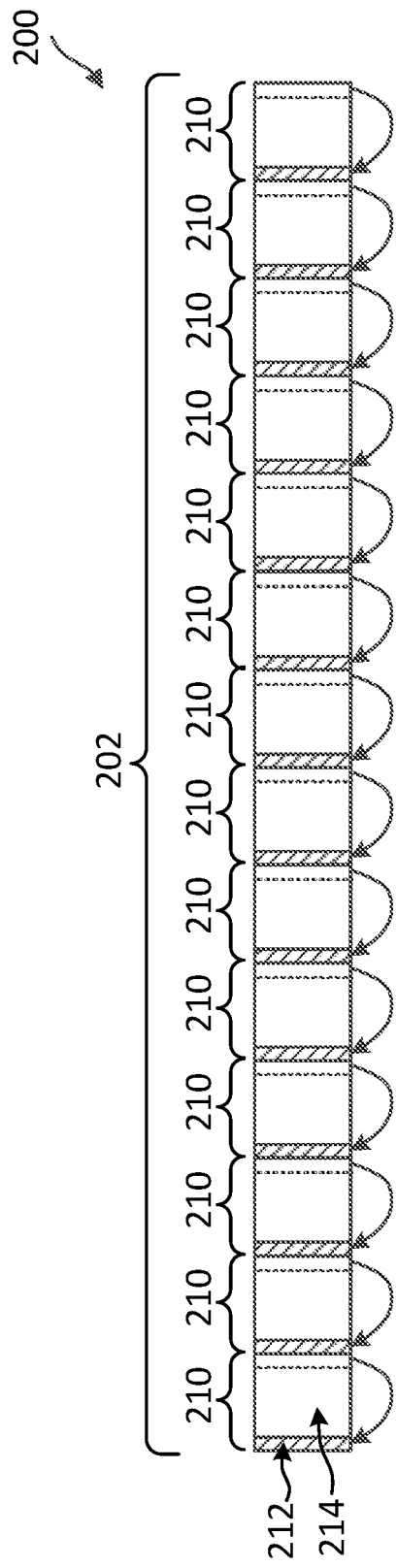
FIG. 2 illustrates a transmission configuration using cyclic prefix (CP)-based waveforms according to some embodiments of the present disclosure.

FIG. 2 illustrates a transmission configuration 200 using CP-based waveforms according to some embodiments of the present disclosure. The configuration 200 may be employed by BSs such as the BSs 105 and UEs such as the UEs 115 in a network such as the network 100 for communications. In the configuration 200, a BS or a UE uses CP-based waveforms for transmission in a transmission period 202. For example, the BS or the UE may receive data from a higher network layer in the form of a transport block (TB) and may organize the data into a plurality of symbols 210 for transmission in the transmission period 202. While FIG. 2 illustrates 14 symbols 210 in the transmission period 202, the transmission period 202 may include any suitable number of symbols 210 (e.g., between about 2 to 14).

Each symbol 210 may include a CP 212 and a useful portion 214. The CPs 212 are shown as pattern-filled boxes. The useful portions 214 are shown as empty-filled boxes. The useful portions 214 may carry data information and/or reference signal sequences (e.g., a demodulation reference signal (DMRS) and/or a phase tracking reference signal (PTRS)). The DMRS can facilitate channel estimation and/or demodulation at a receiver for data recovery. The CP 212 is formed by copying a last portion of the useful portion 214 to the beginning of the useful portion 214. The addition of the CPs 212 serves to mitigate ISI. At a transmitter, fast Fourier transform (FFT) operations are applied to the useful portion 214 of each symbol 210 and the CP 212 is appended to the useful portion 214 in the time domain. At a receiver, the CPs are discarded, the inverse fast Fourier transform (IFFT) operations are applied to the useful portion 214 of each symbol 210.

Figure 3:
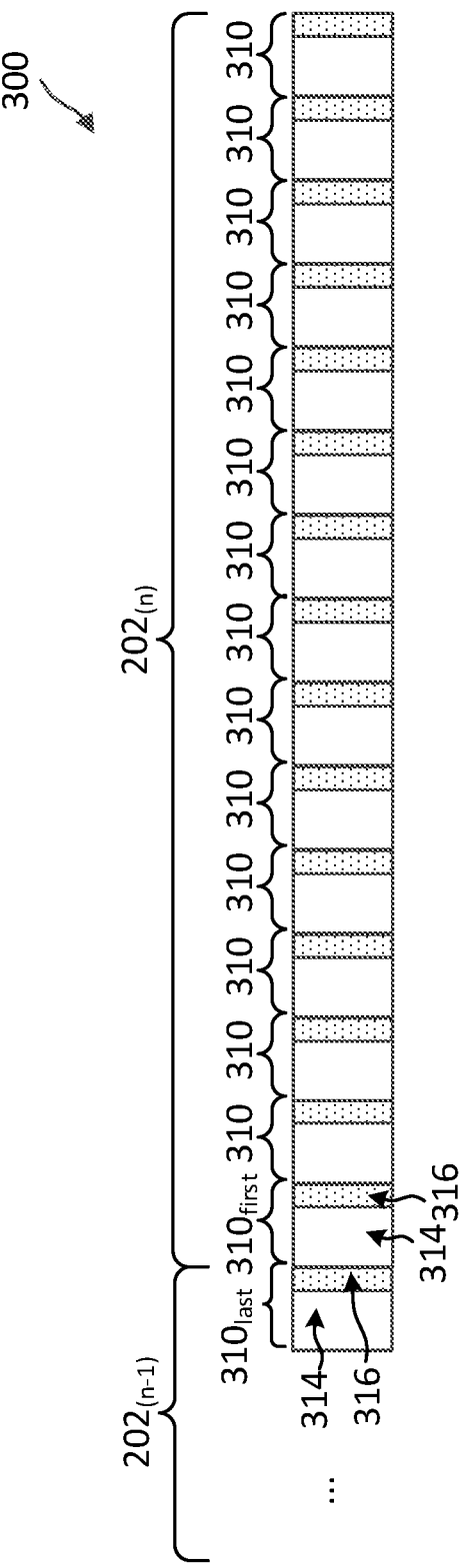
FIG. 3 illustrates a transmission configuration for guard interval (GI)-based waveforms according to some embodiments of the present disclosure.

FIG. 3 illustrates a transmission configuration 300 using GI-based waveforms according to some embodiments of the present disclosure. The configuration 300 may be employed by BSs such as the BSs 105 and UEs such as the UEs 115 in a network such as the network 100 for communications. In the configuration 300, a BS or a UE uses GI-based waveforms for transmission in a transmission period 202. For example, the BS or the UE may receive data from a higher network layer in the form of a TB and may format the data into a plurality of symbols 310 for transmission in the transmission period 202. While FIG. 3 illustrates 15 symbols 310 in the transmission period 202, the transmission period 202 may include any suitable number of symbols 310 (e.g., between about 2 to 15).

Each symbol 310 may include a useful portion 314 followed by a GI 316. The GIs 316 are shown as pattern-filled boxes. The useful portions 314 are shown as empty-filled boxes. The useful portion 3 is substantially similar to the useful portion 214. For example, the useful portion 314 may carry data information and/or reference signal sequences (e.g., DMRSs and/or PTRSs). The GI 316 may be a predetermined sequence that is repeated across the symbols 310 at a periodicity corresponding to the symbol duration. In some instances, the GI 316 may be a zero-valued sequence. In some instances, the lengths of the GI 316 may be configurable. The repeating GIs 316 at the symbol duration can serve to mitigate ISI. At a transmitter, FFT operations are applied to the entire symbol 310 (e.g., including the useful portion 314 and the GI 316) instead of only the useful portion 214 as in the configuration 200. Similarly, at a receiver, IFFT operations are applied to the entire symbol 310.

In some embodiments, the GIs 316 can be further used as a PTRS. For example, a first symbol 310 (e.g., the symbol $310_{first}$) in the transmission period 202 can carry a DMRS. Thus, a receiver may perform channel estimation based on the DMRS and determine a time domain equalizer (TEQ) based on the channel estimate. The receiver may apply the TEQ to the subsequent symbols 316 and perform phase tracking based on the time-equalized GIs 316.

While the repeating GIs 316 can serve to mitigate ISI, each symbol 310 may depend on the GI 316 of a previous symbol 310 to provide ISI mitigation instead of being independent or self-contained in terms of ISI mitigation as in the CP-based symbol 210. The GI dependency can be challenging for signal multiplexing. For example, the first symbol $310_{first}$ in a current transmission period $202_{(n)}$ may depend on the GI 316 of a last symbol $310_{last}$ in the previous transmission period $202_{(n-1)}$, creating signal dependencies across transmission periods 202.

Accordingly, the present disclosure provides techniques to multiplex CP-based waveforms (e.g., including the CP-based symbols 210) with GI-based waveforms (e.g., including the GI-based symbols 310) by considering the potential GI dependencies across transmission periods 202. The present disclosure further provides techniques to multiplex GI-based waveforms with different GI waveforms or different GI sequences.

Figure 4:
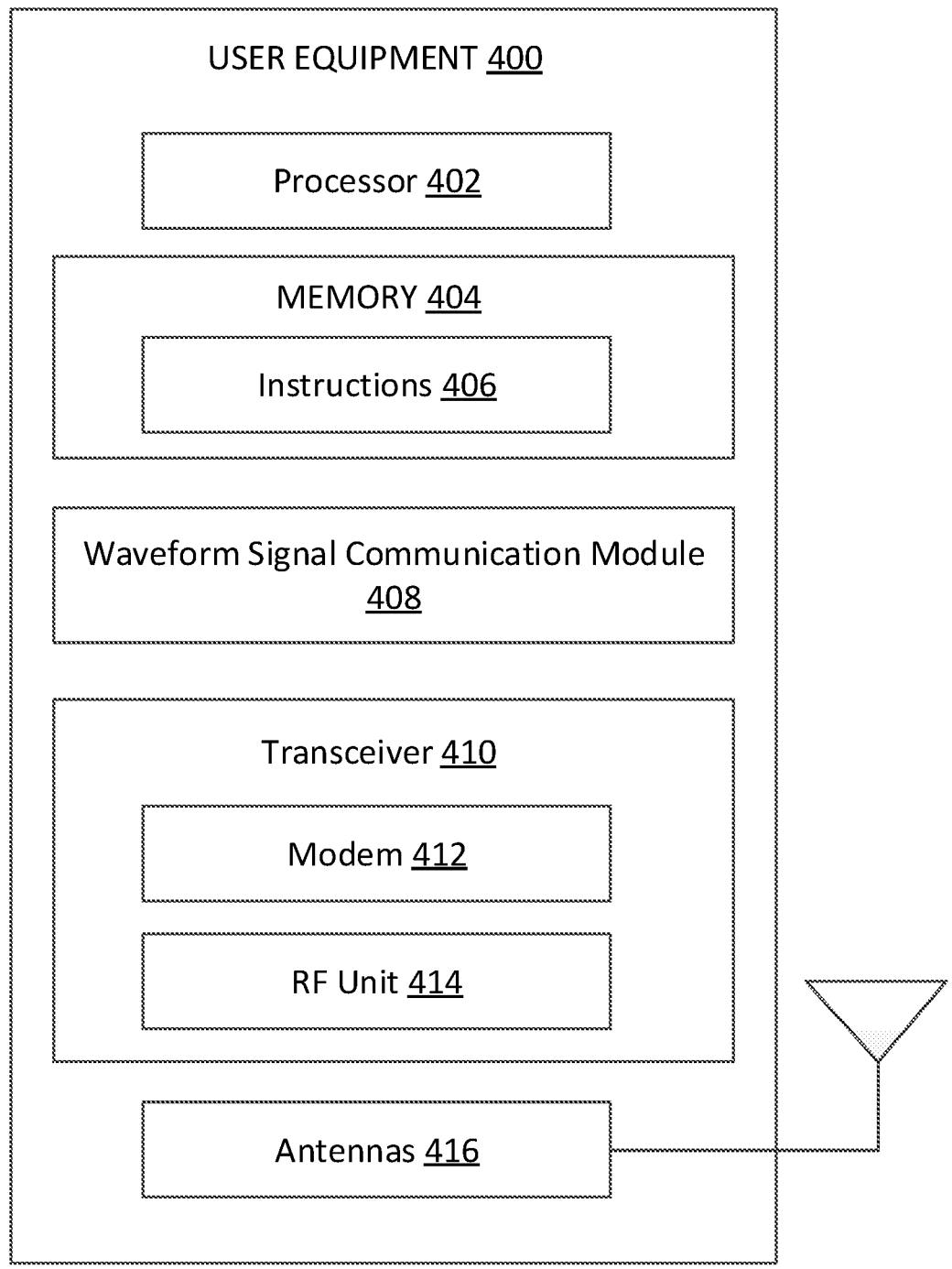
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 as discussed above in FIG. 1. As shown, the UE 400 may include a processor 402, a memory 404, a waveform signal communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-15. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The waveform signal communication module 408 may be implemented via hardware, software, or combinations thereof. For example, the waveform signal communication module 408 may be implemented as a processor, circuit, and/or instructions 406 stored in the memory 404 and executed by the processor 402. The waveform signal communication module 408 may be used for various aspects of the present disclosure, for example, aspects of FIGS. 6-15. For example, the waveform signal communication module 408 is configured to receive a configuration from a BS (e.g., the BSs 105) for communicating signals having a CP-based waveform (e.g., including the CP-based symbols 210) and/or a GI-based waveform (e.g., including the GI-based symbols 310), generate a waveform signal based on the configuration, and/or process a received waveform signal based on the configuration.

In one embodiment, the configuration may indicate a frequency domain based waveform multiplexing, where CP-based waveform signals may be communicated in a frequency band different than GI-based waveform signals.

In one embodiment, the configuration may indicate an inclusion of a blank period in the last symbol of a waveform signal and/or an inclusion of a GI sequence at the end of the waveform signal. As such, the waveform signal communication module 408 may generate a first waveform signal by including data symbols carrying data and reference signal symbols carrying reference signals (e.g., pilot symbols) and leaving a last symbol blank without any transmission. The waveform signal communication module 408 may further insert a GI waveform at the end of the last symbol, where the GI waveform may correspond to a GI waveform of a second waveform signal (e.g., a GI-based waveform signal) after the first waveform signal. The waveform signal communication module 408 may further split the last symbol of the first waveform signal into two or more symbols with a greater SCS. The waveform signal communication module 408 may transmit data in the earlier split symbol(s) within the last symbol and transmit the GI waveform in the last split symbol for the subsequent second waveform signal. Since the greater SCS has a shorter time duration, the first waveform signal can therefore use more portions of the last symbol to transmit its own signal with a reduced overhead for the GI transmission of the subsequent second waveform signal.

In one embodiment, the configuration may indicate an inclusion of repetitions of a reference signal sequence in a beginning symbol of a waveform signal. As such, for transmission, the waveform signal communication module 408 may generate a first waveform signal by including two or more identical reference signal sequence in the beginning symbol of the waveform signal. For reception, the waveform signal communication module 408 may perform FFT operations on overlapping portions of the beginning symbol of a received waveform signal. Mechanisms for generating a communication signal and/or processing a received communication signal that are multiplexed with communication signals of different waveforms are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the waveform signal communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
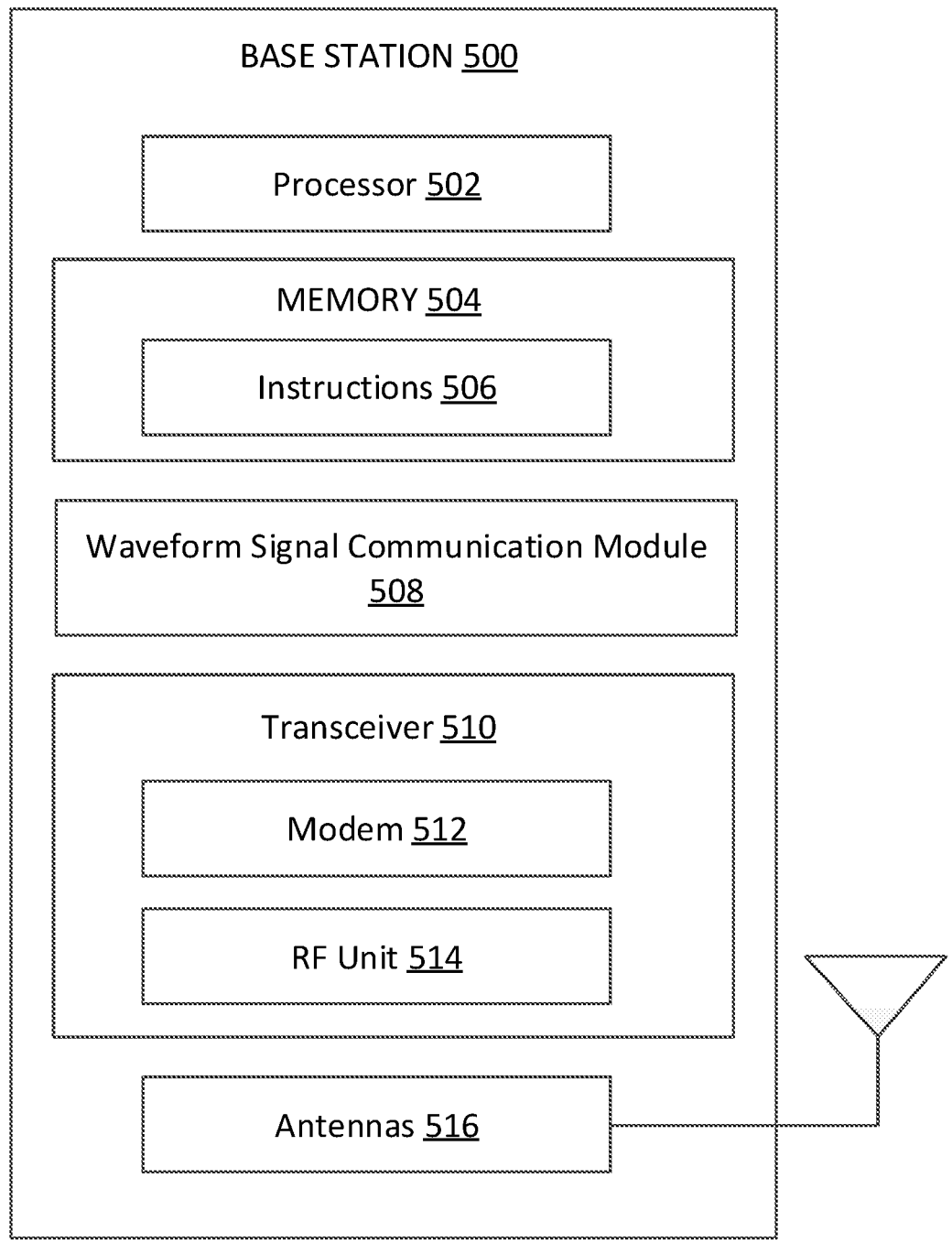
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 as discussed above in FIG. 1. As shown, the BS 500 may include a processor 502, a memory 504, a waveform signal communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The waveform signal communication module 508 may be implemented via hardware, software, or combinations thereof. For example, the waveform signal communication module 508 may be implemented as a processor, circuit, and/or instructions 506 stored in the memory 504 and executed by the processor 502. The waveform signal communication module 508 may be used for various aspects of the present disclosure, for example, aspects of FIGS. 6-15. For example, the waveform signal communication module 508 is configured to transmit a configuration to a UE (e.g., the UEs 115 and 400) for communicating signals having a CP-based waveform (e.g., including the CP-based symbols 210) and/or a GI-based waveform (e.g., including the GI-based symbols 310), generate a waveform signal based on the configuration, and/or process a received waveform signal based on the configuration.

In one embodiment, the configuration may indicate a frequency domain based waveform multiplexing, where CP-based waveform signals may be communicated in a frequency band different than GI-based waveform signals.

In one embodiment, the configuration may indicate an inclusion of a blank period in the last symbol of a waveform signal and/or an inclusion of a GI sequence at the end of the waveform signal. As such, the waveform signal communication module 508 may generate a first waveform signal by including data symbols carrying data and reference signal symbols carrying reference signals (e.g., pilot symbols) and leaving a last symbol blank without any transmission. The waveform signal communication module 508 may further insert a GI waveform at the end of the last symbol, where the GI waveform may correspond to a GI waveform of an expected GI-based waveform signal after the waveform signal. The waveform signal communication module 508 may further split the last symbol of the first waveform signal into about two symbols with a greater SCS and include data in the split symbol at the beginning of the last symbol.

In one embodiment, the configuration may indicate an inclusion of repetitions of a reference signal sequence in a beginning symbol of a waveform signal. As such, for transmission, the waveform signal communication module 508 may generate a waveform signal by including two or more reference signal sequence in the beginning symbol of the first waveform signal. For reception, the waveform signal communication module 508 may perform FFT operations on overlapping portions of the beginning symbol of a received waveform signal. Mechanisms for generating a communication signal and/or processing a received communication signal that are multiplexed with communication signals of different waveforms are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
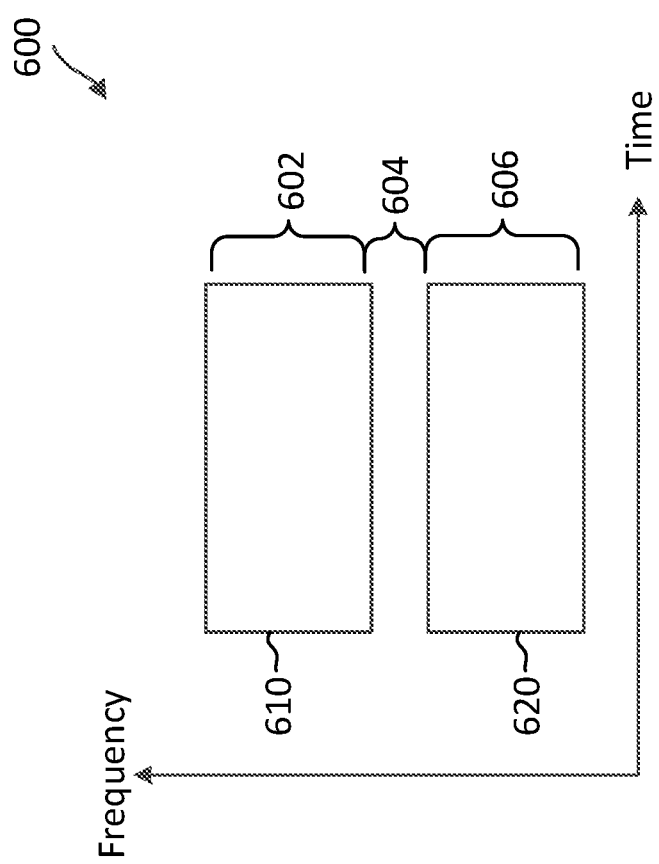
FIG. 6 illustrates a waveform multiplexing scheme according to some embodiments of the present disclosure.

FIG. 6 illustrates a waveform multiplexing scheme 600 according to some embodiments of the present disclosure. The scheme 600 may be employed by BSs such as the BSs 105 and 500 and UEs such as the UEs 115 and 400 in a network such as the network 100 to multiplex CP-based waveform signals with GI-based waveform signals. In FIG. 6, the x-axis represents time in some arbitrary units and the y-axis represents frequency in some arbitrary units. The scheme 600 multiplexes different waveforms in a frequency domain.

As an example, a BS may configure a CP-based waveform signal 610 for transmission in a frequency band 602 (e.g., a BWP). The CP-based waveform signal 610 may have a CP-based OFDM waveform or a CP-based SC waveform. The CP-based waveform signal 610 includes symbols similar to the CP-based symbols 210 each including a CP 212. The BS may configure a GI-based waveform signal 620 for transmission in another frequency band 606 (e.g., another BWP). The GI-based waveform signal 620 may have a GI-based SC waveform. The GI-based waveform signal 620 includes symbols similar to the GI-based symbols 310 each including a GI 316. Since symbol boundaries in a CP-based waveform signal may not be aligned to the symbol boundaries in a GI-based waveform signal, the frequency bands 602 and 606 are separated by a guard frequency band 604 to mitigate interference across the frequency bands 602 and 606. Each of the frequency bands 602 and 606 may be a licensed band, an unlicensed band, or a shared frequency band.

While the scheme 600 may allow a BS to schedule communications with different waveform types, the scheme 600 can be restrictive in terms of scheduling. For example, the BS is limited to schedule a UE in a certain frequency band based on the waveform types (e.g., CP-based or GI-based) configured for the UEs.

Figure 7:
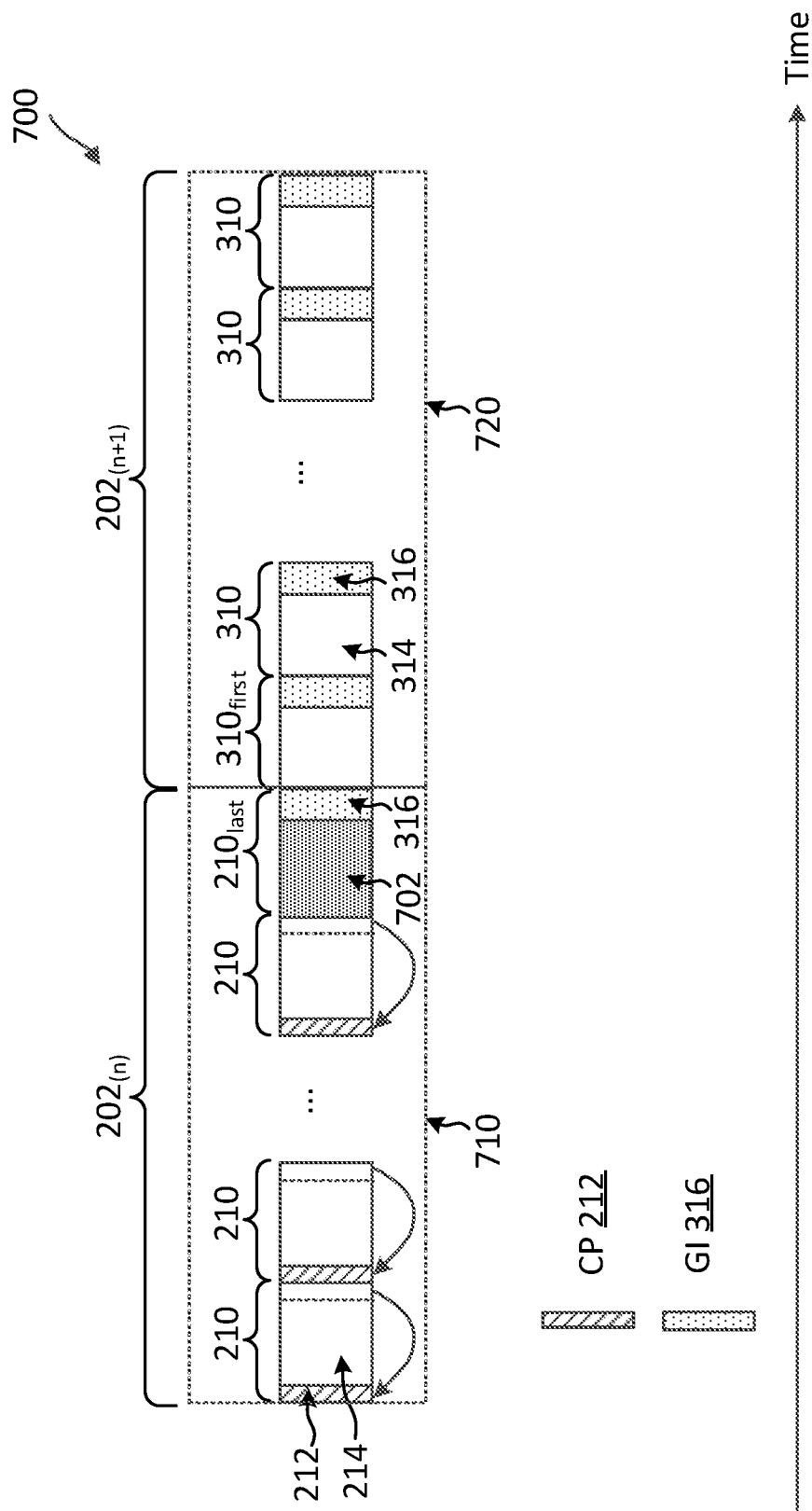
FIG. 7 illustrates a waveform multiplexing scheme according to some embodiments of the present disclosure.
Figure 8:
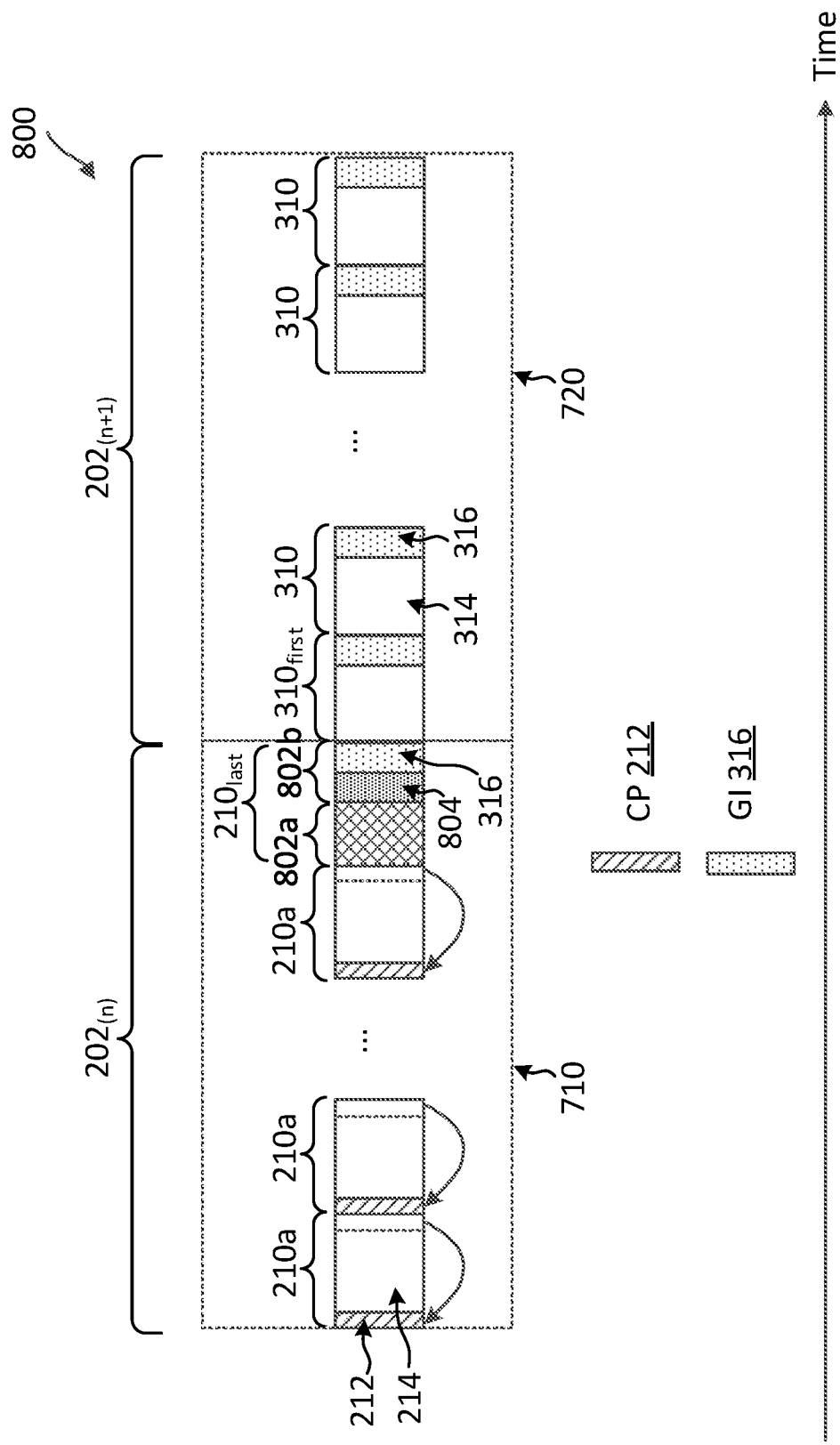
FIG. 8 illustrates a waveform multiplexing scheme according to some embodiments of the present disclosure.
Figure 9:
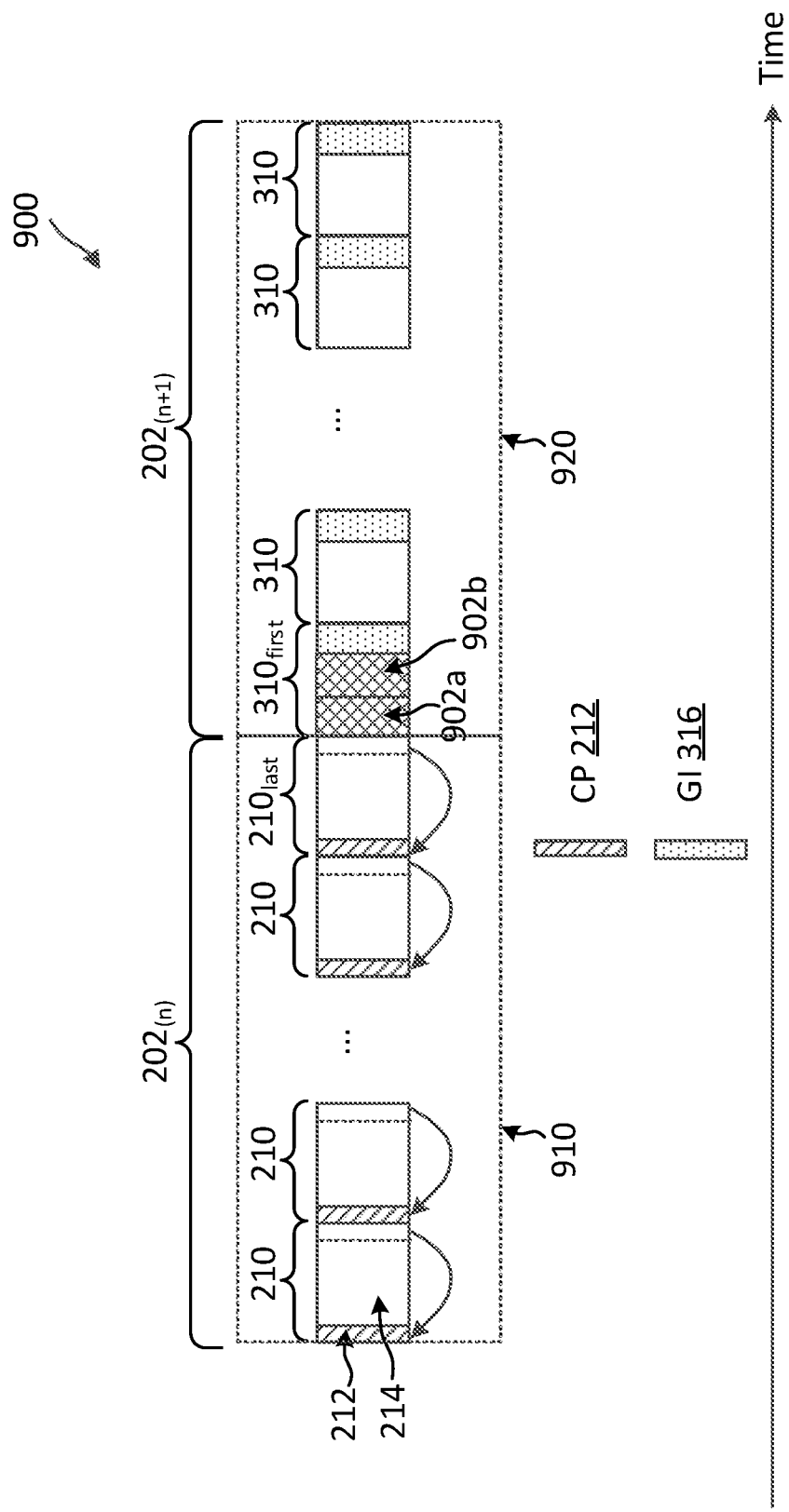
FIG. 9 illustrates a waveform multiplexing scheme according to some embodiments of the present disclosure.

FIGS. 7-9 illustrate various mechanisms for multiplexing CP-based waveform signals (e.g., the CP-based waveform signal 610) with GI-based waveform signals (e.g., the GI-based waveform signal 620) in a time domain to allow for a greater scheduling flexibility. In FIGS. 7-9, the x-axes represent time in some arbitrary units. FIGS. 7-9 are described using the symbol structures shown in FIGS. 2-3, and may use the same reference numerals as in FIGS. 2-3 for simplicity sake.

FIG. 7 illustrates a waveform multiplexing scheme 700 according to some embodiments of the present disclosure. The scheme 700 may be employed by BSs such as the BSs 105 and 500 and UEs such as the UEs 115 and 400 in a network such as the network 100 to multiplex CP-based waveform signals with GI-based waveform signals. As described above, a GI-based waveform signal depends on the GI (e.g., the GIs 316) of a previous waveform signal. In the scheme 700, a CP-based waveform signal is configured to include a blank period with no data transmission in the last symbol to accommodate a GI for the first symbol in a subsequent GI-based waveform signal.

As an example, a CP-based waveform signal 710 (e.g., the CP-based waveform signal 610) is transmitted in a transmission period $202_{(n)}$ and a GI-based waveform signal 720 (e.g., the GI-based waveform signal 620) is transmitted in a next transmission period $202_{(n+1)}$. The GI-based waveform signal 720 includes a plurality of GI-based symbols 310. As described above, each symbol 310 includes a useful portion 314 followed by a GI 316. The symbols 310 may carry data and/or reference signal sequences. The CP-based waveform signal 710 includes a plurality of CP-based symbols 210. The symbols 210 may carry data and/or reference signal sequences, except for the last symbol 210 shown as $210_{last}$. The last symbol $210_{last}$ in the CP-based waveform signal 710 includes a gap or a blank period 702 with no transmission followed by a GI 316. The inclusion of the GI 316 in the last symbol $210_{last}$ of the CP-based waveform signal 710 functions as a GI for the first symbol $310_{first}$ of the GI-based waveform signal 720 in the next transmission period $202_{(n+1)}$. In other words, the inclusion of the GI 316 can reduce or eliminate ISI at the beginning symbol $310_{first}$ of the GI-based waveform signal 720 in the next transmission period $202_{(n+1)}$. Thus, the scheme 700 allows a BS to schedule transmissions of different waveforms across adjacent transmission periods 202 while maintain the performance of GI-based waveform signal at the receiver.

FIG. 8 illustrates a waveform multiplexing scheme 800 according to some embodiments of the present disclosure. The scheme 800 may be employed by BSs such as the BSs 105 and 500 and UEs such as the UEs 115 and 400 in a network such as the network 100 to multiplex CP-based waveform signals with GI-based waveform signals. The scheme 800 is substantially similar to the scheme 700. However, the scheme 800 uses split symbol mechanisms to reduce the blank period overhead. As shown, the last symbol $210_{last}$ in the CP-based waveform signal 710 is split or divided into two split symbols 802a and 802b, for example, by doubling the SCS. In other words, the symbols 210a may have a first SCS and the symbols 802 may have a second SCS that is about two times the first SCS. By splitting the last symbol $210_{last}$ into two symbols 802, the first split symbol 802a may carry data using a CP-based symbol structure (e.g., including a CP similar to the CP 212, but may include a shorter duration) and the second split symbol 802b may include a blank period 804 and a GI 316.

The splitting of the last symbol $210_{last}$ of the CP-based waveform signal 710 may provide a shorter blank period 804 compared to the blank period 702 in the scheme 700. As an example, the symbol 210 may have a duration of about 8 microsecond (μs), but the GI 316 may only require a duration of about 0.5 μs. Thus, in the scheme 700, the blank period 702 may have a duration of about 7.5 μs with no data information. As a further example, the symbols 210 may have an SCS of about 120 kilohertz (kHz) and the split symbols 802 may have an SCS of about 240 kHz (e.g., two times of 120 kHz). Thus, each split symbol 802 may have a duration of about 4 μs. As such, with the 0.5 μs GI duration, the blank period 804 may have an unused duration of about 3.5 μs instead of about 7.5 μs as in scheme 700. Accordingly, the scheme 800 can reduce the blank period overhead and improve spectral efficiency or resource utilization efficiency.

In some embodiments, the blank period 804 in the scheme 800 can include an extended CP or a GI for better medium utilization. While the scheme 800 is illustrated with dividing the last symbol $210_{last}$ into two split symbols 802, the scheme 800 may divide the last symbol $210_{last}$ into more than two split symbols (e.g., about 3 or 4) to further reduce the blank period overhead. In addition, depending on the duration of the GI 316, the number of split symbols 802 in the last symbol $210_{last}$, and/or the duration of the split symbols 802, the duration of the blank period 804 may vary, and in some embodiments, the blank period 804 may not be present in the last symbol $210_{last}$ of the CP-based waveform signal 710.

FIG. 9 illustrates a waveform multiplexing scheme 900 according to some embodiments of the present disclosure. The scheme 900 may be employed by BSs such as the BSs 105 and 500 and UEs such as the UEs 115 and 400 in a network such as the network 100 to multiplexing CP-based waveform signals with GI-based waveform signals. The scheme 900 structures the GI-based waveform signal such that the GI-based waveform signal may not depend on a GI in a previous signal. For example, in the scheme 900, a GI-based waveform signal may include a front-loaded DMRS symbol including multiple identical reference signal sequences (e.g., DMRSs).

Similar to the schemes 700 and 800, a CP-based waveform signal 910 (e.g., the CP-based waveform signals 610 and 710) is transmitted in a transmission period $202_{(n)}$ and a GI-based waveform signal 920 (e.g., the GI-based waveform signals 620 and 720) is transmitted in a next transmission period $202_{(n+1)}$. The first symbol $310_{first}$ in the GI-based waveform signal 920 includes repetitions of a reference signal sequence 902 (e.g., a DMRS) followed by a GI 316. The repeating identical reference signal sequences 902 may function as GIs for each other instead of relying on the GI of a last symbol in a previous signal as in the schemes 700 and 800. As such, the CP-based waveform signal 910 in the previous transmission period $202_{(n)}$ is not required to include a blank period and/or a GI 316.

While FIG. 9 illustrates the GI-based waveform signal 920 including a single symbol $310_{first}$ including two identical reference signal sequences 902a and 902b, the first symbol $310_{first}$ may include any suitable number of identical reference signal sequences 902 (e.g., about 3 or more). In addition, the GI-based waveform signal 920 may include one or more additional symbols 310 (e.g., DMRS symbols) carrying a reference signal sequence. For example, an additional DMRS symbol 310 may include a single reference signal sequence, which may be the same or different sequences than the reference signal sequence 902 and may include a longer length than the reference signal sequence 902, for example, spanning the entire symbol 310.

The repeating reference signal sequences 902 may allow a receiver to perform channel estimation in a time domain or a frequency domain. For example, for time domain channel estimation, the receiver may discard the beginning samples of the symbol $310_{first}$ that may be affected by ISI from a previous symbol transmission (e.g., the CP-based symbol $210_{last}$) and perform correlation based on the remaining samples (e.g., including a concatenation of the repeating reference signal sequences 902). For frequency domain channel estimation, the receiver may discard the beginning samples of the symbol $310_{first}$ that may be affected by ISI from a previous symbol and apply FFTs to the remaining samples in symbol $310_{first}$.

Figure 10:
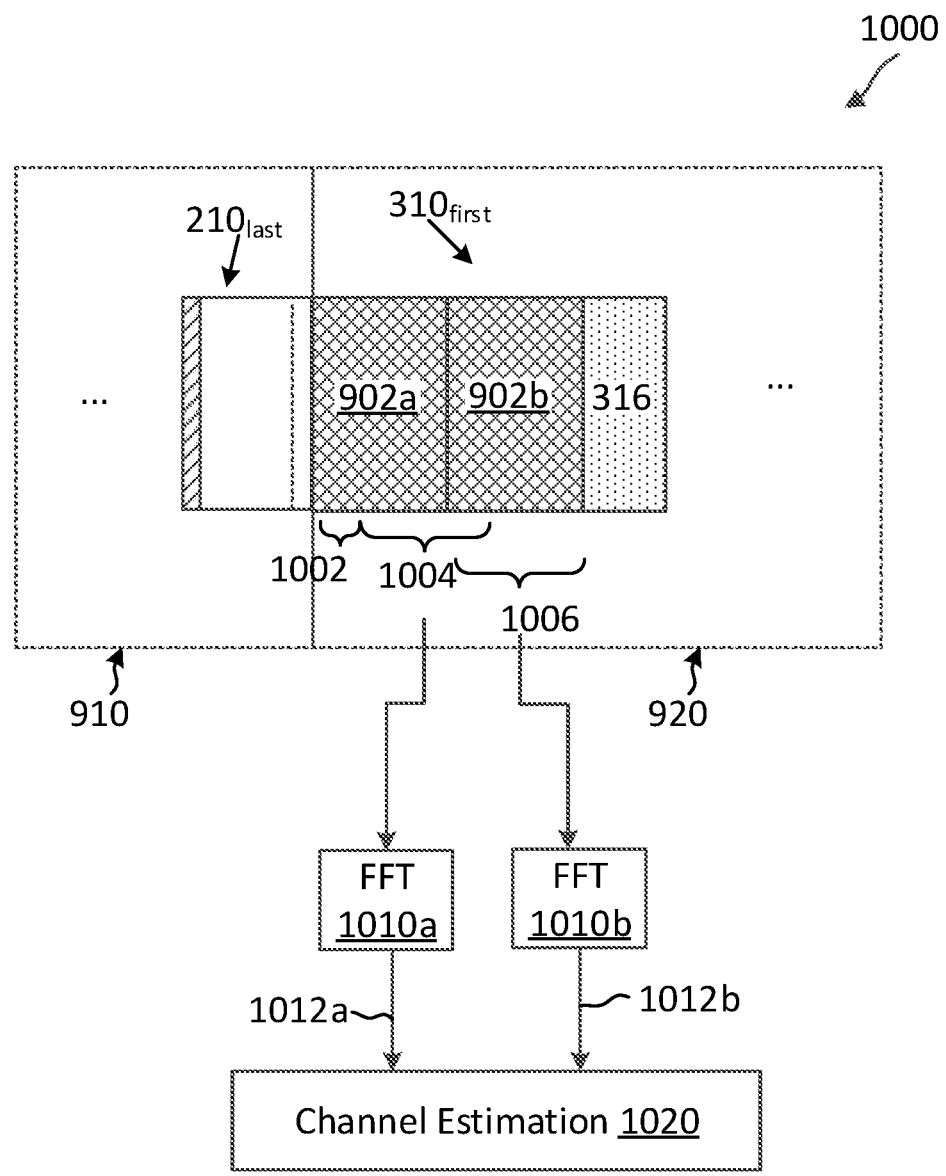
FIG. 10 illustrates a channel estimation scheme according to some embodiments of the present disclosure.

FIG. 10 illustrates a channel estimation scheme 1000 according to some embodiments of the present disclosure. The scheme 1000 may be employed by BSs such as the BSs 105 and 500 and UEs such as the UEs 115 and 400 in a network such as the network 100 for channel estimation. The scheme 1000 may be used in conjunction with the scheme 900.

For example, a receiver of a BS or a UE may receive a GI-based waveform signal 920 transmitted using the scheme 900. The receiver may perform channel estimation based on the multiple identical reference signal sequences 902 in the first symbol $310_{first}$ of the received GI-based waveform signal 920. The receiver may discard some samples 1002 (e.g., corresponding to the reference signal sequence 902a) at the beginning of the symbol $310_{first}$. The samples 1002 may be impacted by ISI from the previous symbol $210_{last}$ (e.g., in the CP-based waveform signal 910). The number of samples 1002 to discard may be dependent on the expected channel delay spread.

After discarding the samples 1002, the receiver may select multiple sets of samples from the remaining samples in the symbol $310_{first}$. FIG. 10 illustrates two sets of samples 1004 and 1006 for purposes of simplicity of discussion, though it will be recognized that embodiments of the present disclosure may scale to many more sets. The receiver may apply an FFT to each set of samples. As shown, the receiver may apply a first FFT 1010a to the samples 1004 to produce an output 1012a. The receiver may apply a second FFT 1010b to the samples 1006 to produce an output 1012b.

As an example, the symbol $310_{first}$ may include about 512 samples, the receiver may discard a number of samples corresponding to the length of the GI 316 and the FFTs 1010 may have an FFT size of about 256. For example, when the system uses an SCS of about 7.68 MHz corresponding to a symbol duration of about 130 ns and an FFT size of about 512 to cover a system bandwidth of about 2.16 GHz. With a GI duration of about 26, 102 samples can be discarded to avoid ICI. In addition, since the first symbol includes two repeated reference signal sequences 902a and 902b, the receiver can perform a 256-point FFT with two overlapping set of samples. Thus, the FFTs 1010 may be applied to sample sets with some overlap as shown. The receiver may perform channel estimation 1020 by combining the FFT outputs 1012a and 1012b in a frequency domain with an appropriate phase ramping.

Figure 11:
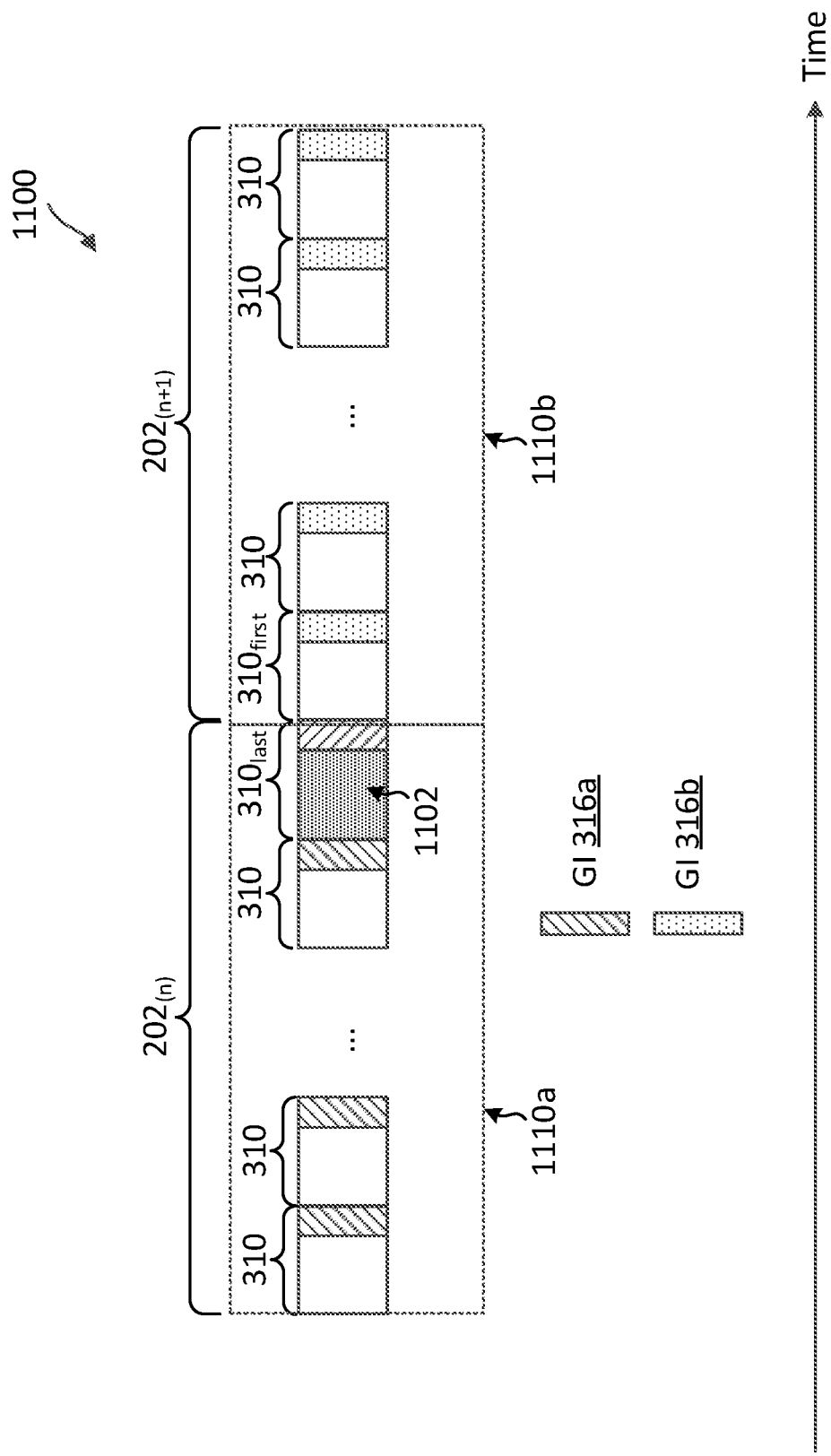
FIG. 11 illustrates a waveform multiplexing scheme according to some embodiments of the present disclosure.
Figure 12:
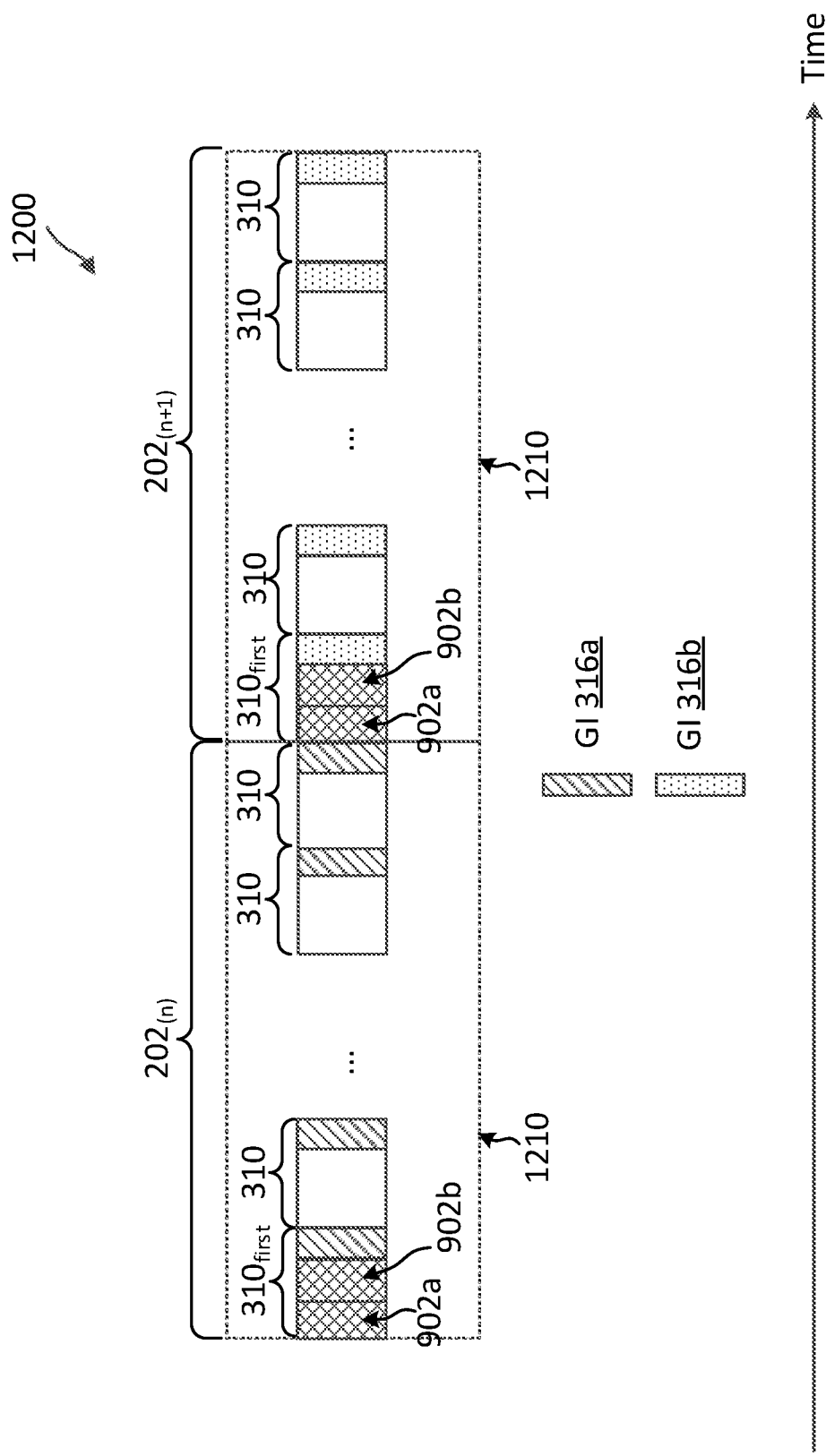
FIG. 12 illustrates a waveform multiplexing scheme according to some embodiments of the present disclosure.

FIGS. 11-12 illustrate various mechanisms for multiplexing GI-based waveform signals (e.g., the GI-based waveform signals 620, 720, and 920) with different GI waveforms and/or different GI sequences. In FIGS. 11-12, the x-axes represent time in some arbitrary units. FIGS. 11-12 are described using the symbol structures shown in FIGS. 2-3, and may use the same reference numerals as in FIGS. 2-3 for simplicity sake.

FIG. 11 illustrates a waveform multiplexing scheme 1100 according to some embodiments of the present disclosure. The scheme 1100 may be employed by BSs such as the BSs 105 and 500 and UEs such as the UEs 115 and 400 in a network such as the network 100 to multiplex GI-based waveform signals with different GI waveforms and/or different GI sequences. The scheme 1100 is substantially similar to the scheme 700, where a blank period 1102 (e.g., the blank period 702) is included at the end of a GI-based waveform signal 1110a to avoid causing ISI to a subsequent GI-based waveform signal 1110b and/or to accommodate a GI 316 for the first symbol of the subsequent GI-based waveform signal 1110b.

As shown, a GI-based waveform signal 1110a is transmitted in a current transmission period $202_{(n)}$ and a GI-based waveform signal 1110b is transmitted in a next transmission period $202_{(n+1)}$. The GI-based waveform signal 1110a includes symbols 310 with a GI 316a, where the last symbol $310_{last}$ includes the blank period 1102. The GI-based waveform signal 1110b includes symbols 310 with a GI 316b. The GI 316a may have a different waveform than the GI 316b due to various reasons. For example, a BS may communicate the GI-based waveform signal 1110a with a first UE in the transmission period $202_{(n)}$ and switch to communicate the GI-based waveform signal 1110b with a second, different UE in the subsequent transmission period $202_{(n+1)}$. The different UEs may be configured with different active BWPs for communications with the BS. The different UEs may use different beam directions to communicate with the BS. In general, the transmissions of the GI-based waveform signals 1110a and 1110b can be over different channels with different BWPs and/or different beam directions. As such, there is no guarantee that the GI 316 in the last symbol $310_{last}$ of the GI-based waveform signals 1110a may be used by the first symbol $310_{first}$ of the subsequent GI-based waveform signals 1110b for ISI mitigation.

In some embodiments, the GI-based waveform signal 1110a may include a GI that is suitable for the subsequent GI-based waveform signal 1110b to facilitate ISI mitigation. For example, when the BS uses different beam directions to communicate with the first and second UEs, the BS may transmit the GI 316a in the last symbol $310_{last}$ of the GI-based waveform signal 1110a in a beam direction of the second UE. In some embodiments, the GI 316a and 316b may include different sequences. Thus, the BS may include a GI 316b in the last symbol $310_{last}$ of the GI-based waveform signal 1110a instead of the GI 316a to facilitate the communication of the subsequent GI-based waveform signal 1110b with the GIs 316b. In some embodiments, the scheme 1100 may reduce the blank period 1102 by using the split symbol mechanisms as described in the scheme 800 with respect to FIG. 8.

FIG. 12 illustrates a waveform multiplexing scheme 1200 according to some embodiments of the present disclosure. The scheme 1200 may be employed by BSs such as the BSs 105 and 500 and UEs such as the UEs 115 and 400 in a network such as the network 100 to multiplex GI-based waveform signals with different GI waveforms and/or different GI sequences. The scheme 1200 is substantially similar to the scheme 900. As shown, a GI-based waveform signal 1210 may include multiple identical reference signal sequences 902 in a first symbol $310_{first}$ of the GI-based waveform signal 1210. Thus, each GI-based waveform signal 1210 is self-contained and may not be impacted by a previous GI-based waveform signal 1210 having a different GI waveform and/or a different GI sequence.

In some embodiments, the mechanisms described above in the schemes 600, 700, 800, 900, 1000, 1100, and 1200 may be used together in any suitable combination for multiplexing CP-based OFDM waveforms, CP-based SC waveforms, and/or GI-based waveforms in a licensed spectrum, a shared spectrum, and/or an unlicensed spectrum. When communicating over a shared spectrum and/or an unlicensed spectrum, a BS may schedule UEs for communications using a combination of the CP-based waveforms and the GI-based waveforms within a TXOP.

Figure 13:
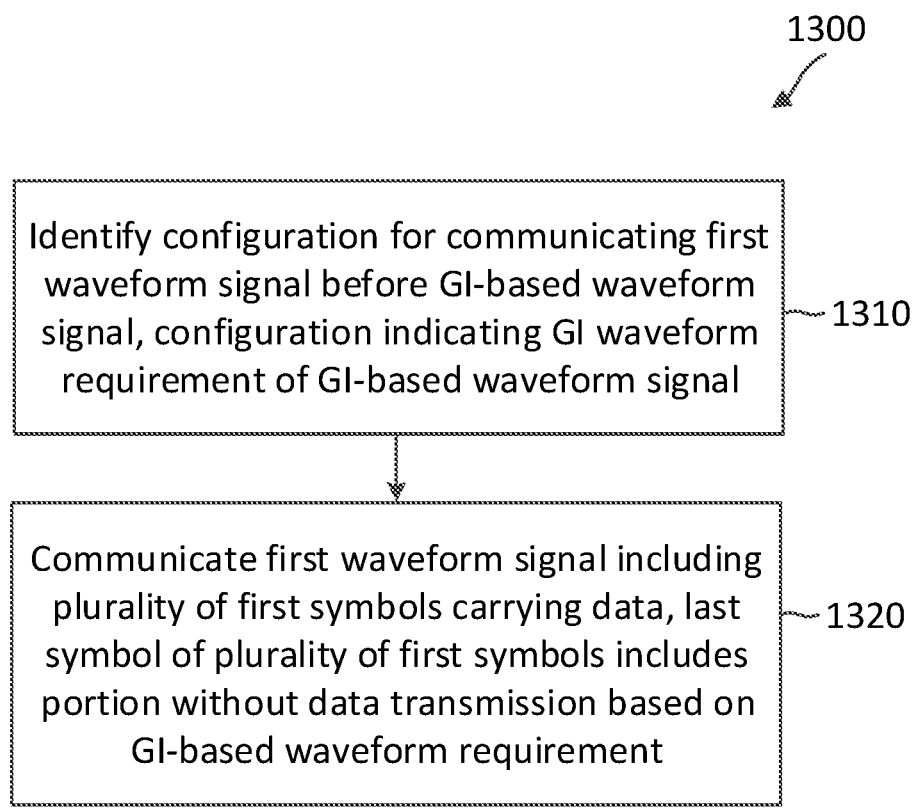
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the waveform signal communication module 408, the transceiver 410, and the one or more antennas 416, to execute the steps of method 1300. In another example, a wireless communication device, such as the BS 105 or BS 500, may utilize one or more components, such as the processor 502, the memory 504, the waveform signal communication module 508, the transceiver 510, and the one or more antennas 516, to execute the steps of method 1300. The method 1300 may employ similar mechanisms as in the schemes 700, 800, and 1100 described above with respect to FIGS. 7, 8, and 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes identifying, by a first wireless communication device, a configuration for communicating a first waveform signal (e.g., the CP-based waveform signals 610, 710, and 910 or the GI-based waveform signals 620, 720, and 1110) before a GI-based waveform signal (e.g., the GI-based waveform signals 620, 720, and 1110). The configuration indicates a GI waveform requirement of the GI-based waveform signal.

At step 1320, the method 1300 includes communicating, by the first wireless communication device with a second wireless communication device, the first waveform signal including data. The first waveform signal includes a plurality of first symbols (e.g., the symbols 210 or 310), where a last symbol (e.g., the symbols $210_{last}$ or $310_{last}$) of the plurality of first symbols includes a portion (e.g., the blank periods 702, 804, and 1102 and/or the GIs 316) without data transmission based on the GI waveform requirement.

In an embodiment, the first wireless communication device further communicates, with a third wireless communication device, the GI-based waveform signal after the first waveform signal. The third wireless communication device may be the same as the second wireless communication device or different from the second wireless communication device. The GI-based waveform signal includes a plurality of second symbols (e.g., the symbols 310), where each of the plurality of second symbols includes a first GI (e.g., the GI 316).

In some embodiments, the communicating the first waveform signal includes communicating, by the first wireless communication device with the second wireless communication device based on the GI waveform requirement, a second GI in the portion of the last symbol of the first waveform signal, where the first GI and the second GI include the same waveform. In some instances, the GI waveform requirement may indicate that the first waveform signal is required to leave the portion in the last symbol without data transmission to accommodate the second GI. The GI waveform requirement may additionally indicate the first GI waveform of the GI-based waveform signal.

In an embodiment, the first waveform signal is a CP-based OFDM or SC waveform signal. Thus, each of the plurality of first symbols (e.g., the symbols 210) in the first waveform signal includes a CP (e.g., the CPs 212) except for the last symbol. The last symbol of the first waveform signal may include a second GI having the same waveform as the first GI. Thus, the second GI in the first waveforms signal serves as a GI for the first symbol of the GI-based waveform signal after the first waveform signal.

In another embodiment, the first waveform signal is a GI-based waveform signal. Thus, each of the plurality of first symbols in the first waveform signal includes a second GI except the last symbol. The first GI and the second GI may have different waveforms. The last symbol of the first waveform signal may include a GI having the same waveform as the first GI to serve as a GI for the first symbol of the GI-based waveform signal after the first waveform signal.

In an embodiment, the first waveform signal is communicated in a first frequency band or BWP and the GI-based waveform signal is communicated in a second frequency band or BWP different from the first frequency band.

In an embodiment, the first waveform signal is communicated in a first beam direction and the GI-based waveform signal is communicated in a second beam direction different than the first beam direction.

In an embodiment, the first wireless communication device communicates the first waveform signal by communicating, with the second wireless communication device, first data in a symbol of the plurality of first symbols before the last symbol based on a first SCS and second data in the last symbol based on a second SCS different than the first SCS. For example, the last symbol may be divided into two symbols, where the second SCS may be about double the first SCS.

In an embodiment, first wireless communication device may be a BS (e.g., the BSs 105 and the BS 500) and the second wireless communication device may be a UE (e.g., the UEs 115 and the UE 400). In such an embodiment, the first wireless communication device may further transmit the identified configuration to the second wireless communication device. In another embodiment, the first wireless communication device may be a UE (e.g., the UEs 115 and the UE 400) and the second wireless communication device may be a BS (e.g., the BSs 105 and the BS 500). In such an embodiment, the first wireless communication device may identify the configuration by receiving the configuration from the second wireless communication device.

Figure 14:
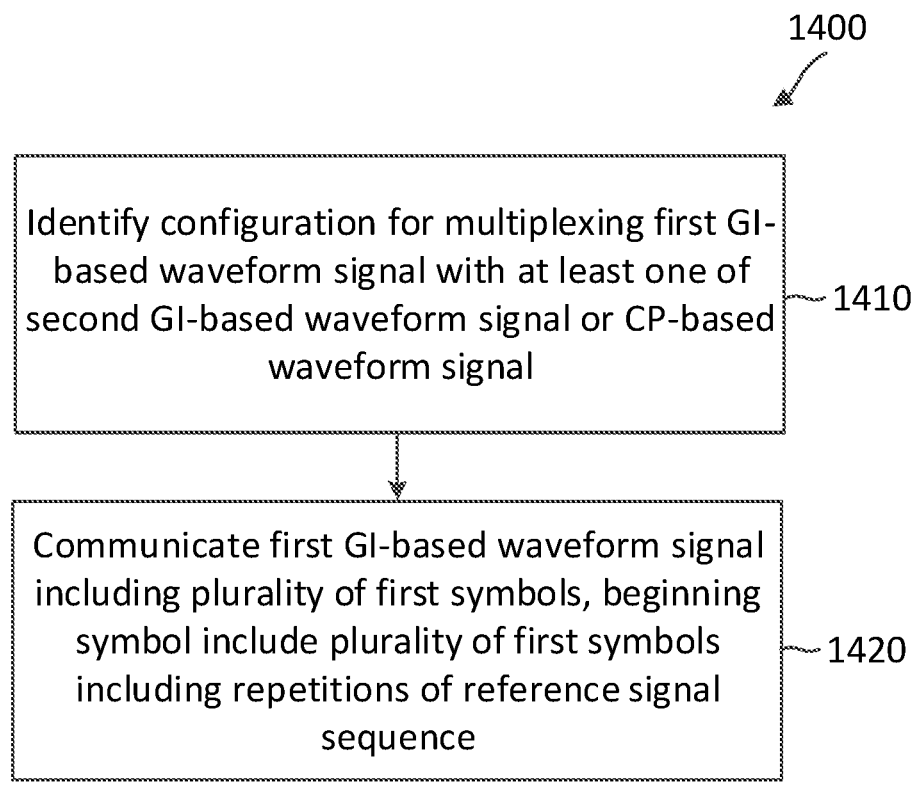
FIG. 14 is a flow diagram of a communication method according to some embodiments of the present disclosure.

FIG. 14 is a flow diagram of a communication method 1400 according to some embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the waveform signal communication module 408, the transceiver 410, and the one or more antennas 416, to execute the steps of method 1400. In another example, a wireless communication device, such as the BS 105 or BS 500, may utilize one or more components, such as the processor 502, the memory 504, the waveform signal communication module 508, the transceiver 510, and the one or more antennas 516, to execute the steps of method 1400. The method 1400 may employ similar mechanisms as in the schemes 900, 1000, and 1200 described above with respect to FIGS. 9, 10, and 12, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes identifying, by a first wireless communication device, a configuration for communicating a first GI-based waveform signal (e.g., the GI-based waveform signals 920 and 1210) after at least one of a second GI-based waveform signal or a CP-based waveform signal (e.g., the CP-based waveform signals 610, 710, and 910).

At step 1420, the method 1400 includes communicating, by the first wireless communication device with a second wireless communication device, the first GI-based waveform signal including a plurality of first symbols (e.g., the symbols 310), where a beginning symbol (e.g., the symbols $310_{first}$) of the plurality of first symbols include repetitions of a reference signal sequence (e.g., the reference signal sequences 902) based on the configuration.

Each of the plurality of first symbols in the first GI-based waveform signal includes a first GI. In an embodiment, the first wireless communication device may identify the configuration for communicating the first GI-based waveform signal after the CP-based waveform signal. The CP-based waveform signal includes a plurality of second symbols (e.g., the symbols 210), where each of the plurality of second symbols includes a CP (e.g., the CPs 212). In another embodiment, the first wireless communication device may identify the configuration for communicating the first GI-based waveform signal after the second GI-based waveform signal. The second GI-based waveform signal includes a plurality of second symbols (e.g., the symbols 210), where each of the plurality of second symbols includes a second GI. The first GI and the second GI may have the same waveform or different waveforms.

In an embodiment, the first GI-based waveform signal is communicated in a first frequency band or BWP and the second GI-based waveform signal is communicated in a second frequency band different from the first frequency band.

In an embodiment, the first GI-based waveform signal is communicated in a first beam direction and the second GI-based waveform signal is communicated in a second beam direction different than the first beam direction.

In an embodiment, the first wireless communication device may be a BS (e.g., the BSs 105 and the BS 500) and the second wireless communication device may be a UE (e.g., the UEs 115 and the UE 400). In an embodiment, the first wireless communication device may be a UE (e.g., the UEs 115 and the UE 400) and the second wireless communication device may be a BS (e.g., the BSs 105 and the BS 500).

Figure 15:
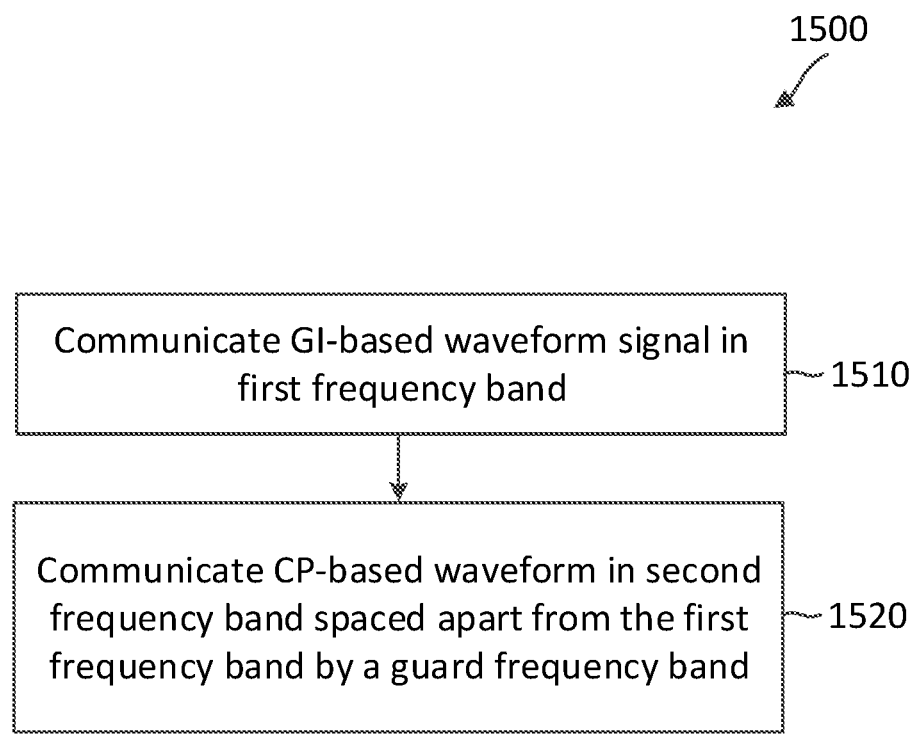
FIG. 15 is a flow diagram of a communication method according to some embodiments of the present disclosure.

FIG. 15 is a flow diagram of a communication method 1500 according to some embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the waveform signal communication module 408, the transceiver 410, and the one or more antennas 416, to execute the steps of method 1500. In another example, a wireless communication device, such as the BS 105 or BS 500, may utilize one or more components, such as the processor 502, the memory 504, the waveform signal communication module 508, the transceiver 510, and the one or more antennas 516, to execute the steps of method 1500. The method 1500 may employ similar mechanisms as in the scheme 600 described above with respect to FIG. 6. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes communicating, by a first wireless communication device with a second wireless communication device in a first frequency band (e.g., the first frequency band 602), a GI-based waveform signal (e.g., GI-based waveform signals 620, 720, 1110, and 1210).

At step 1520, the method 1500 includes communicating, by the first wireless communication device with the second wireless communication device in a second frequency band (e.g., the frequency band 606), a CP-based waveform signal (e.g., CP-based waveform signals 610, 710, and 910). The second frequency band is spaced apart from the first frequency band by a guard frequency band (e.g., the guard band 604).

In an embodiment, the first wireless communication device may be a BS (e.g., the BSs 105 and the BS 500) and the second wireless communication device may be a UE (e.g., the UEs 115 and the UE 400). In an embodiment, the first wireless communication device may be a UE (e.g., the UEs 115 and the UE 400) and the second wireless communication device may be a BS (e.g., the BSs 105 and the BS 500).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the disclosure include a method of wireless communication, comprising identifying, by a first wireless communication device, a configuration for communicating a first waveform signal before a guard interval (GI)-based waveform signal, the configuration indicating a GI waveform requirement of the GI-based waveform signal; and communicating, by the first wireless communication device with a second wireless communication device, the first waveform signal including a plurality of first symbols carrying data, wherein a last symbol of the plurality of first symbols includes a portion without data transmission based on the GI waveform requirement.

In some embodiments, the method further comprises communicating, by the first wireless communication device with a third wireless communication device, the GI-based waveform signal after the first waveform signal. In some embodiments, wherein the GI-based waveform signal includes a plurality of second symbols, and wherein at least some of the plurality of second symbols includes a first GI. In some embodiments, wherein the communicating includes communicating, by the first wireless communication device with the second wireless communication device, a second GI in the portion of the last symbol of the first waveform signal based on the GI waveform requirement, and wherein the first GI and the second GI include the same waveform. In some embodiments, wherein at least some of the plurality of first symbols in the first waveform signal includes a cyclic prefix (CP). In some embodiments, wherein at least some of the plurality of first symbols in the first waveform signal includes a second GI. In some embodiments, wherein the first GI and the second GI include different waveforms. In some embodiments, wherein the first waveform signal is communicated in a first frequency band, and wherein the GI-based waveform signal is communicated in a second frequency band different from the first frequency band. In some embodiments, wherein the first waveform signal is communicated in a first beam direction, and wherein the GI-based waveform signal is communicated in a second beam direction different than the first beam direction. In some embodiments, wherein the communicating includes communicating, by the first wireless communication device with the second wireless communication device, first data in a symbol of the plurality of first symbols before the last symbol based on a first subcarrier spacing (SCS); and communicating, by the first wireless communication device with the second wireless communication device, second data in the last symbol based on a second SCS different than the first SCS.

Further embodiments of the disclosure include a method of wireless communication, comprising identifying, by a first wireless communication device, a configuration for communicating a first guard interval (GI)-based waveform signal after at least one of a second GI-based waveform signal or a cyclic prefix (CP)-based waveform signal; and communicating, by the first wireless communication device with a second wireless communication device, the first GI-based waveform signal including a plurality of first symbols, wherein a beginning symbol of the plurality of first symbols include repetitions of a reference signal sequence based on the configuration.

In some embodiments, wherein the identifying includes identifying the configuration for communicating the first GI-based waveform signal after the CP-based waveform signal, and the method further comprises communicating, by the first wireless communication device with the second wireless communication device, the CP-based waveform signal including a plurality of second symbols, wherein each of the plurality of second symbols includes a CP. In some embodiments, wherein each of the plurality of first symbols in the first GI-based waveform signal includes a first GI. In some embodiments, wherein the identifying includes identifying the configuration for communicating the first GI-based waveform signal after the second GI-based waveform signal, and the method further comprises: communicating, by the first wireless communication device with a third wireless communication device, the second GI-based waveform signal including a plurality of second symbols, wherein each of the plurality of second symbols includes a second GI. In some embodiments, wherein the first GI and the second GI include different waveforms. In some embodiments, wherein the first GI-based waveform signal is communicated in a first frequency band, and wherein the second GI-based waveform signal or the CP-based waveform signal is communicated in a second frequency band different than the first frequency band. In some embodiments, wherein the first GI-based waveform signal is communicated in a first beam direction, and wherein the second GI-based waveform signal or the CP-based waveform signal is communicated in a second beam direction different than the first beam direction.

Further embodiments of the disclosure include a method of wireless communication device, comprising communicating, by a first wireless communication device with a second wireless communication device in a first frequency band, a guard interval (GI)-based waveform signal; and communicating, by the first wireless communication device with the second wireless communication device in a second frequency band, a cyclic prefix (CP)-based waveform signal, the second frequency band spaced apart from the first frequency band by a guard frequency band.

In some embodiments, wherein the GI-based waveform signal includes a plurality of symbols, and wherein each of the plurality of symbols includes a GI. In some embodiments, wherein the CP-based waveform signal includes a plurality of symbols, and wherein each of the plurality of symbols includes a CP.

Further embodiments of the disclosure include an apparatus comprising a processor configured to identify a configuration for communicating a first waveform signal before a guard interval (GI)-based waveform signal, the configuration indicating a GI waveform requirement of the GI-based waveform signal; and a transceiver configured to communicate, with a first wireless communication device, the first waveform signal including a plurality of first symbols carrying data, wherein a last symbol of the plurality of first symbols includes a portion without data transmission based on the GI waveform requirement.

In some embodiments, wherein the transceiver is further configured to communicate, with a second wireless communication device, the GI-based waveform signal after the first waveform signal. In some embodiments, wherein the GI-based waveform signal includes a plurality of second symbols, and wherein at least some of the plurality of second symbols includes a first GI. In some embodiments, wherein the transceiver is further configured to communicate the first waveform signal by communicating, with the first wireless communication device, a second GI in the portion of the last symbol of the first waveform signal based on the GI waveform requirement, and wherein the first GI and the second GI include the same waveform. In some embodiments, wherein at least some of the plurality of first symbols in the first waveform signal includes a cyclic prefix (CP). In some embodiments, wherein at least some of the plurality of first symbols in the first waveform signal includes a second GI. In some embodiments, wherein the first GI and the second GI include different waveforms. In some embodiments, wherein the first waveform signal is communicated in a first frequency band, and wherein the GI-based waveform signal is communicated in a second frequency band different from the first frequency band. In some embodiments, wherein the first waveform signal is communicated in a first beam direction, and wherein the GI-based waveform signal is communicated in a second beam direction different than the first beam direction. In some embodiments, wherein the transceiver is further configured to communicate the first waveform signal by communicating, with the first wireless communication device, first data in a symbol of the plurality of first symbols before the last symbol based on a first subcarrier spacing (SCS); and communicating, with the first wireless communication device, second data in the last symbol based on a second SCS different than the first SCS.

Further embodiments of the disclosure include an apparatus comprising a processor configured to identify a configuration for communicating a first guard interval (GI)-based waveform signal after at least one of a second GI-based waveform signal or a cyclic prefix (CP)-based waveform signal; and a transceiver configured to communicate, with a first wireless communication device, the first GI-based waveform signal including a plurality of first symbols, wherein a beginning symbol of the plurality of first symbols include repetitions of a reference signal sequence based on the configuration.

In some embodiments, wherein the processor is further configured to identify the configuration by identifying the configuration for communicating the first GI-based waveform signal after the CP-based waveform signal, and the transceiver is further configured to communicate the first waveform signal by communicating, with the first wireless communication device, the CP-based waveform signal including a plurality of second symbols, wherein each of the plurality of second symbols includes a CP. In some embodiments, wherein each of the plurality of first symbols in the first GI-based waveform signal includes a first GI. In some embodiments, wherein the processor is further configured to identify the configuration by identifying the configuration for communicating the first GI-based waveform signal after the second GI-based waveform signal, and the transceiver is further configured to communicate the first waveform signal by communicating, with a second wireless communication device, the second GI-based waveform signal including a plurality of second symbols, wherein each of the plurality of second symbols includes a second GI. In some embodiments, wherein the first GI and the second GI include different waveforms. In some embodiments, wherein the first GI-based waveform signal is communicated in a first frequency band, and wherein the second GI-based waveform signal or the CP-based waveform signal is communicated in a second frequency band different than the first frequency band. In some embodiments, wherein the first GI-based waveform signal is communicated in a first beam direction, and wherein the second GI-based waveform signal or the CP-based waveform signal is communicated in a second beam direction different than the first beam direction.

Further embodiments of the disclosure include an apparatus comprising a transceiver configured to communicate, with a first wireless communication device in a first frequency band, a guard interval (GI)-based waveform signal; and communicate, with the first wireless communication device in a second frequency band, a cyclic prefix (CP)-based waveform signal, the second frequency band spaced apart from the first frequency band by a guard frequency band.

In some embodiments, wherein the GI-based waveform signal includes a plurality of symbols, and wherein each of the plurality of symbols includes a GI. In some embodiments, wherein the CP-based waveform signal includes a plurality of symbols, and wherein each of the plurality of symbols includes a CP.

Further embodiments of the disclosure include a computer-readable medium having program code recorded thereon, the program code comprising code for causing a first wireless communication device to identify a configuration for communicating a first waveform signal before a guard interval (GI)-based waveform signal, the configuration indicating a GI waveform requirement of the GI-based waveform signal; and code for causing the first wireless communication device to communicate, with a second wireless communication device, the first waveform signal including a plurality of first symbols carrying data, wherein a last symbol of the plurality of first symbols includes a portion without data transmission based on the GI waveform requirement.

In some embodiments, the computer-readable medium further comprises code for causing the first wireless communication device to communicate, with a third wireless communication device, the GI-based waveform signal after the first waveform signal. In some embodiments, wherein the GI-based waveform signal includes a plurality of second symbols, and wherein at least some of the plurality of second symbols includes a first GI. In some embodiments, wherein the code for causing the first wireless communication device to communicate the first waveform signal is further configured to communicate, with the second wireless communication device, a second GI in the portion of the last symbol of the first waveform signal based on the GI waveform requirement, and wherein the first GI and the second GI include the same waveform. In some embodiments, wherein at least some of the plurality of first symbols in the first waveform signal includes a cyclic prefix (CP). In some embodiments, wherein at least some of the plurality of first symbols in the first waveform signal includes a second GI. In some embodiments, wherein the first GI and the second GI include different waveforms. In some embodiments, wherein the first waveform signal is communicated in a first frequency band, and wherein the GI-based waveform signal is communicated in a second frequency band different from the first frequency band. In some embodiments, wherein the first waveform signal is communicated in a first beam direction, and wherein the GI-based waveform signal is communicated in a second beam direction different than the first beam direction. In some embodiments, wherein the code for causing the first wireless communication device to communicate the first waveform signal is further configured to communicate, with the second wireless communication device, first data in a symbol of the plurality of first symbols before the last symbol based on a first subcarrier spacing (SCS); and communicate, with the second wireless communication device, second data in the last symbol based on a second SCS different than the first SCS.

Further embodiments of the disclosure include a computer-readable medium having program code recorded thereon, the program code comprising code for causing a first wireless communication device to identify a configuration for communicating a first guard interval (GI)-based waveform signal after at least one of a second GI-based waveform signal or a cyclic prefix (CP)-based waveform signal; and code for causing the first wireless communication device to communicate, with a second wireless communication device, the first GI-based waveform signal including a plurality of first symbols, wherein a beginning symbol of the plurality of first symbols include repetitions of a reference signal sequence based on the configuration.

In some embodiments, wherein the code for causing the first wireless communication device to identify the configuration is further configured to identify the configuration for communicating the first GI-based waveform signal after the CP-based waveform signal, and the computer-readable medium further comprises code for causing the first wireless communication device to communicate, with the second wireless communication device, the CP-based waveform signal including a plurality of second symbols, wherein each of the plurality of second symbols includes a CP. In some embodiments, wherein each of the plurality of first symbols in the first GI-based waveform signal includes a first GI. In some embodiments, wherein the code for causing the first wireless communication device to identify the configuration is further configured to identify the configuration for communicating the first GI-based waveform signal after the second GI-based waveform signal, and the computer-readable medium further comprises code for causing the first wireless communication device to communicate, with a third wireless communication device, the second GI-based waveform signal including a plurality of second symbols, wherein each of the plurality of second symbols includes a second GI. In some embodiments, wherein the first GI and the second GI include different waveforms. In some embodiments, wherein the first GI-based waveform signal is communicated in a first frequency band, and wherein the second GI-based waveform signal or the CP-based waveform signal is communicated in a second frequency band different than the first frequency band. In some embodiments, wherein the first GI-based waveform signal is communicated in a first beam direction, and wherein the second GI-based waveform signal or the CP-based waveform signal is communicated in a second beam direction different than the first beam direction.

Further embodiments of the disclosure include a computer-readable medium having program code recorded thereon, the program code comprising code for causing a first wireless communication device to communicate, with a second wireless communication device in a first frequency band, a guard interval (GI)-based waveform signal; and code for causing the first wireless communication device to communicate, with the second wireless communication device in a second frequency band, a cyclic prefix (CP)- based waveform signal, the second frequency band spaced apart from the first frequency band by a guard frequency band.

In some embodiments, wherein the GI-based waveform signal includes a plurality of symbols, and wherein each of the plurality of symbols includes a GI. In some embodiments, wherein the CP-based waveform signal includes a plurality of symbols, and wherein each of the plurality of symbols includes a CP.

Further embodiments of the disclosure include an apparatus comprising means for identifying a configuration for communicating a first waveform signal before a guard interval (GI)-based waveform signal, the configuration indicating a GI waveform requirement of the GI-based waveform signal; and means for communicating, with a first wireless communication device, the first waveform signal including a plurality of first symbols carrying data, wherein a last symbol of the plurality of first symbols includes a portion without data transmission based on the GI waveform requirement.

In some embodiments, the apparatus further comprises means for communicating, with a second wireless communication device, the GI-based waveform signal after the first waveform signal. In some embodiments, wherein the GI-based waveform signal includes a plurality of second symbols, and wherein at least some of the plurality of second symbols includes a first GI. In some embodiments, wherein the means for communicating the first waveform signal is further configured to communicate, with the first wireless communication device, a second GI in the portion of the last symbol of the first waveform signal based on the GI waveform requirement, and wherein the first GI and the second GI include the same waveform. In some embodiments, wherein at least some of the plurality of first symbols in the first waveform signal includes a cyclic prefix (CP). In some embodiments, wherein at least some of the plurality of first symbols in the first waveform signal includes a second GI. In some embodiments, wherein the first GI and the second GI include different waveforms. In some embodiments, wherein the first waveform signal is communicated in a first frequency band, and wherein the GI-based waveform signal is communicated in a second frequency band different from the first frequency band. In some embodiments, wherein the first waveform signal is communicated in a first beam direction, and wherein the GI-based waveform signal is communicated in a second beam direction different than the first beam direction. In some embodiments, wherein the means for communicating the first waveform signal is further configured to communicate, with the first wireless communication device, first data in a symbol of the plurality of first symbols before the last symbol based on a first subcarrier spacing (SCS); and communicate, with the first wireless communication device, second data in the last symbol based on a second SCS different than the first SCS.

Further embodiments of the disclosure include an apparatus comprising means for identifying a configuration for communicating a first guard interval (GI)-based waveform signal after at least one of a second GI-based waveform signal or a cyclic prefix (CP)-based waveform signal; and means for communicating, with a first wireless communication device, the first GI-based waveform signal including a plurality of first symbols, wherein a beginning symbol of the plurality of first symbols include repetitions of a reference signal sequence based on the configuration.

In some embodiments, wherein the means for identifying the configuration is further configured to identify the configuration for communicating the first GI-based waveform signal after the CP-based waveform signal, and the apparatus further comprises means for communicating, with the first wireless communication device, the CP-based waveform signal including a plurality of second symbols, wherein each of the plurality of second symbols includes a CP. In some embodiments, wherein each of the plurality of first symbols in the first GI-based waveform signal includes a first GI. In some embodiments, wherein the means for identifying the configuration is further configured to identify the configuration for communicating the first GI-based waveform signal after the second GI-based waveform signal, and the apparatus further comprises means for communicating, with a second wireless communication device, the second GI-based waveform signal including a plurality of second symbols, wherein each of the plurality of second symbols includes a second GI. In some embodiments, wherein the first GI and the second GI include different waveforms. In some embodiments, wherein the first GI-based waveform signal is communicated in a first frequency band, and wherein the second GI-based waveform signal or the CP-based waveform signal is communicated in a second frequency band different than the first frequency band. In some embodiments, wherein the first GI-based waveform signal is communicated in a first beam direction, and wherein the second GI-based waveform signal or the CP-based waveform signal is communicated in a second beam direction different than the first beam direction.

Further embodiments of the disclosure include an apparatus comprising means for communicating, with a first wireless communication device in a first frequency band, a guard interval (GI)-based waveform signal; and means for communicating, with the first wireless communication device in a second frequency band, a cyclic prefix (CP)-based waveform signal, the second frequency band spaced apart from the first frequency band by a guard frequency band.

In some embodiments, wherein the GI-based waveform signal includes a plurality of symbols, and wherein each of the plurality of symbols includes a GI. In some embodiments, wherein the CP-based waveform signal includes a plurality of symbols, and wherein each of the plurality of symbols includes a CP.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device, a configuration for multiplexing, in the time domain, a cyclic prefix (CP)-based waveform signal in a first transmission period and a first guard interval (GI)-based waveform signal in a second transmission period after the first transmission period; and
   communicating, by the first wireless communication device with a second wireless communication device, the first GI-based waveform signal in the second transmission period, the second transmission period including a plurality of first symbols, wherein a beginning symbol of the first GI-based waveform and of the plurality of first symbols includes one or more repetitions of a reference signal sequence based on the configuration, the one or more repetitions of the reference signal sequence followed by a first GI such that the first GI is dependent on the one or more repetitions of the reference signal sequence and independent of the CP-based waveform signal in the first transmission period.

2. The method of claim 1, wherein:
the method further comprises communicating, by the first wireless communication device with the second wireless communication device, the CP-based waveform signal in the first transmission period, the first transmission period including a plurality of second symbols, wherein each of the plurality of second symbols includes a CP.

3. The method of claim 1, wherein each of the plurality of first symbols in the first GI-based waveform signal includes a first GI.

4. The method of claim 3, wherein:
the identifying includes identifying the configuration for communicating the first GI-based waveform signal after a second GI-based waveform signal, and
the method further comprises communicating, by the first wireless communication device with a third wireless communication device, the second GI-based waveform signal including a plurality of second symbols, wherein each of the plurality of second symbols includes a second GI.

5. The method of claim 4, wherein the first GI and the second GI include different waveforms.

6. The method of claim 1, wherein the first GI-based waveform signal is communicated in a first frequency band, and wherein the CP-based waveform signal is communicated in a second frequency band different than the first frequency band.

7. The method of claim 1, wherein the first GI-based waveform signal is communicated in a first beam direction, and wherein the CP-based waveform signal is communicated in a second beam direction different than the first beam direction.

8. The method of claim 1, wherein a last symbol of the CP-based waveform signal includes a blank period with no transmission followed by the first GI.

9. A method of wireless communication, comprising:
communicating, by a first wireless communication device with a second wireless communication device in a first bandwidth part (BWP), a guard interval (GI)-based waveform signal, wherein the GI-based waveform signal comprises a GI-based single-carrier (SC) waveform; and
communicating, by the first wireless communication device with the second wireless communication device in a second BWP, a cyclic prefix (CP)-based waveform signal frequency multiplexed with the GI-based waveform signal, the CP-based waveform signal comprising an orthogonal frequency-division multiplexing (OFDM) based waveform, the second BWP spaced apart from the first BWP by a guard frequency band.

10. The method of claim 9, wherein the GI-based waveform signal includes a plurality of symbols, and wherein each of the plurality of symbols includes a GI.

11. The method of claim 9, wherein the CP-based waveform signal includes a plurality of symbols, and wherein each of the plurality of symbols includes a CP.

12. The method of claim 9, wherein the first BWP and the second BWP are located in a licensed band, an unlicensed band, or a shared frequency band.

* * * * *